US010875188B2

(12) United States Patent
Nahavandi et al.

(10) Patent No.: US 10,875,188 B2
(45) Date of Patent: Dec. 29, 2020

(54) UNIVERSAL MOTION SIMULATOR

(71) Applicant: DEAKIN UNIVERSITY, Waurn (AU)

(72) Inventors: Saeid Nahavandi, Highton (AU);
Zoran Najdovski, Geelong (AU); Asim
Bhatti, Highton (AU)

(73) Assignee: DEAKIN UNIVERSITY, Waurn (AU)

( * ) Notice: Subject to any disclaimer, the term of this
patent is extended or adjusted under 35
U.S.C. 154(b) by 0 days.

(21) Appl. No.: 14/872,177

(22) Filed: Oct. 1, 2015

(65) Prior Publication Data
US 2016/0096276 A1 Apr. 7, 2016

Related U.S. Application Data

(63) Continuation of application No. 12/520,224, filed as application No. PCT/AU2007/001969 on Dec. 19, 2007, now Pat. No. 9,174,344.

(30) Foreign Application Priority Data

Dec. 19, 2006 (AU) .................................. 2006907038
May 18, 2007 (AU) .................................. 2007902660
Jul. 13, 2007 (AU) .................................. 2007903796

(51) Int. Cl.
*B25J 13/02* (2006.01)
(52) U.S. Cl.
CPC .................................. *B25J 13/025* (2013.01)
(58) Field of Classification Search
CPC ...................................................... B25J 13/025
See application file for complete search history.

(56) References Cited

U.S. PATENT DOCUMENTS

| 4,030,207 | A | | 6/1977 | Kron |
| 4,537,547 | A | | 8/1985 | Cole |
| 4,751,662 | A | * | 6/1988 | Crosbie ............. G09B 9/12 434/55 |
| 5,459,382 | A | * | 10/1995 | Jacobus ............. B25J 9/1689 318/568.1 |
| 5,587,937 | A | | 12/1996 | Massie et al. |
| 5,625,576 | A | | 4/1997 | Massie et al. |
| 5,898,599 | A | | 4/1999 | Massie et al. |
| 5,980,255 | A | | 11/1999 | Mathieu et al. |
| 6,088,020 | A | | 7/2000 | Mor |
| 6,126,373 | A | | 10/2000 | Yee et al. |
| 6,281,651 | B1 | | 8/2001 | Haanpaa et al. |

(Continued)

FOREIGN PATENT DOCUMENTS

DE 3239211 A 5/1983
EP 980037 A 4/2000

(Continued)

*Primary Examiner* — Quan-Zhen Wang
*Assistant Examiner* — Rajsheed O Black-Childress
(74) *Attorney, Agent, or Firm* — Eversheds Sutherland (US) LLP

(57) ABSTRACT

The present application provides a motion simulator apparatus and method of use. The motion simulator apparatus may include an anthropomorphic robot arm adapted to provide at least six degrees of freedom of movement, a user pod for receiving a user and being operatively connected to the anthropomorphic robot arm, and a haptic interface operatively associated with the user pod for providing haptic feedback to the user in correspondence with the movement of the user pod.

22 Claims, 16 Drawing Sheets

(56) References Cited

U.S. PATENT DOCUMENTS

| | | |
|---|---|---|
| 6,396,232 B2 | 5/2002 | Haanpaa et al. |
| 6,405,158 B1 | 6/2002 | Massie et al. |
| 6,437,771 B1 * | 8/2002 | Rosenberg .............. A63F 13/06 |
| | | 345/156 |
| 6,634,885 B2 * | 10/2003 | Hodgetts ................. G09B 9/12 |
| | | 434/29 |
| 6,776,722 B2 * | 8/2004 | De-Gol ................. A63G 31/16 |
| | | 434/55 |
| 6,781,569 B1 | 8/2004 | Gregorio et al. |
| 6,853,965 B2 | 2/2005 | Massie et al. |
| 8,630,734 B2 * | 1/2014 | Hasenzahl ............. B25J 9/1651 |
| | | 318/568.11 |
| 2001/0002098 A1 | 5/2001 | Haanpaa et al. |
| 2003/0034994 A1 | 2/2003 | Massie et al. |
| 2005/0027397 A1 | 2/2005 | Niemeyer |
| 2005/0042578 A1 * | 2/2005 | Ammon ................... G09B 9/04 |
| | | 434/62 |
| 2005/0128186 A1 | 6/2005 | Shahoian et al. |
| 2005/0156877 A1 | 7/2005 | Schaeffer |
| 2005/0222830 A1 | 10/2005 | Massie et al. |
| 2006/0115348 A1 | 6/2006 | Kramer |

FOREIGN PATENT DOCUMENTS

| | | |
|---|---|---|
| EP | 1629949 A | 3/2006 |
| WO | 1995 10080 A | 4/1995 |
| WO | 2000 46000 A | 8/2000 |
| WO | 2006 037017 A | 4/2006 |

\* cited by examiner

UNIVERSAL MOTION SIMULATOR

RELATED APPLICATIONS

This application claims priority to U.S. Ser. No. 12/520,224 entitled "Method and Apparatus for Haptic Control", filed on Aug. 7, 2009, now allowed; which in turn claims priority to International Application No. PCT/AU2007/001969 entitled "Method and Apparatus for Haptic Control", filed on Dec. 19, 2007; which in turn claims priority to Australian Provisional Patent Application No. 2006907038 in the name of Deakin University, which was filed on 19 Dec. 2006, entitled "Method and Apparatus for a Remote Interface", Australian Provisional Patent Application No. 2007902660 in the name of Deakin University, which was filed on 18 May 2007, entitled "Method and Apparatus for Motion Simulation", and Australian Provisional Patent Application No. 2007903796 in the name of Deakin University, which was filed on 13 Jul. 2007, entitled "Haptic Control" and the specifications thereof are incorporated herein by reference in their entirety and for all purposes.

FIELD OF INVENTION

The present invention relates to the field of remote interfacing utilising haptic technology. "Haptic" refers to the sense of touch, and, as such any technology that creates a sense of touch or, generally sensory feedback sensation(s) to a human operator can be classified as haptic technology.

BACKGROUND OF INVENTION

Throughout this specification the use of the word "inventor" in singular form may be taken as reference to one (singular) or all (plural) inventors of the present invention. The inventor has identified the following related art.

In general, the field of haptics relates to the development, testing, and refinement of tactile and force feedback devices and supporting software that permit users to sense, or "feel", and manipulate virtual objects or an environment with respect to such attributes as shape, weight, surface textures, temperature and so on.

Generally, it may be stated that of the five senses, namely, sight, sound, smell, touch and taste, it is sight, sound and touch that provide the most information about an environment, where the other senses are more subtle.

In humans, tactile sensing is generally achieved by way of receptor cells located near the surface of the skin, the highest density of which may be found in the hands. These receptors can perceive vibrations of up to about 300 Hz. Therefore, in a haptic interface tactile feedback may generally involve relatively high frequency sensations applied in the proximity of the surface of the skin, usually in response to contact, as such, between a user and a virtual object. In contrast, the human sensing of forces may be considered as more kinesthetic in nature, and may ordinarily be achieved by receptors situated deeper in the body. These receptors are located in muscles, tendons and joints and may be stimulated by movement and loading of a user's body parts. The stimulus frequency of these receptors may be much lower, lying in the range of about 0-10 Hz. Accordingly, in a haptic interface force feedback may comprise artificial forces exerted directly onto the user from some external source.

Therefore, it may be considered there are two aspects to the sense of touch; firstly that which provides kinesthetic information and secondly that which provides tactile information. The kinesthetic information that a user perceives about an object are coarse properties such as its position in space, and whether the surfaces are deformable or resilient to touch. Tactile information may be considered to convey the texture or roughness of an object being 'touched'. It is desirable that both types of 'touching' information be used in a realistic haptic interface.

Haptic Interfaces are systems that enable a user to interact with a virtual environment by sensing a user's movements and then relaying this information to the virtual environment. Along side this interaction, sensory feedback is provided to the user which reflects their actions within this environment, and as a result, it is the design of the haptic interface which conveys the level of sensory interactivity between the user and the virtual environment.

A device developed by M.I.T and SensAble Technologies, Inc, is called the PHANToM™ (Personal Haptic Interface Mechanism) interface, which is largely used in the field of computer haptics. The PHANToM™ interface may allow a user to feel the forces of interaction that they would experience by touching a real version of an object with a pencil or the end of their finger.

A majority of haptic devices are desktop devices, such as those sold under the PHANToM™ range including the PHANToM Omni™ and PHANToM Premium™. Other devices are generally wearable ones such as gloves and haptic body suits and may have high degrees of freedom and consequently are very expensive. Lower cost haptic devices are usually desktop devices as they have less controlled/actuated degrees of freedom (DOF) compared to their total DOF. For example, the PHANToM Omni™ has 6 DOF however only 3 of those are actuated and therefore this device is considered to only provide limited interactivity, i.e. sensors are easier and cheaper to install than motors. Accordingly, at present, certain lower cost haptic devices marketed under the PHANToM™ brand exhibit a force feedback which is only available to three degrees of freedom, namely, in the linear dimensions (x, y, z) out of the six complete degrees of freedom.

During the design stage of a haptic interface, one needs to determine the number of sensors and actuators to be used on the interface so that the level of interaction provides for the highest quality force feedback. In existing interface designs, the inventor is witnessing the use of a larger sensor to actuator ratio, which results in a highly interactive dimensional experience, but is reduced in the level of sensory feedback. The introduction of larger sensor numbers is mainly due to the difficulties in designing a completely transparent force feedback system with high degrees of freedom. Another contributor is the low-cost factor to commercial implementation of more sensors over actuators.

Transparency allows a user to feel realistic forces without adjusting to mechanical issues such as backlash and the weight of the interface itself. It is therefore understandable to see higher transparency interfaces in a low-cost commercial system, as it utilises fewer degrees of freedom that provide force feedback. More complex devices and therefore more expensive ones consequently offer less transparency; however provide greater usability for the requirements of rendering and interacting with rich and complex virtual worlds.

The current low-cost interfaces have limitations that have been recognised to provide certain restrictions on the user from interacting with the virtual environment. One of these restrictions is the ability to grasp and manipulate virtual objects with sensory/force feedback. Grasping is one of the most basic abilities of human interaction, yet it has shown to be one of the most difficult to achieve with respect to haptic interface design.

Early attempts at simulating grasping were based on the use of two, three degree of freedom (DOF) devices. While this configuration provides a very realistic simulation, a significant amount of workspace is required, which is very limiting if an attempt is made to utilise a dual-hand approach. There have been several attempts at developing a desktop device which is able to simulate grasping with three dimensional manipulation and force feedback, however the majority of these devices have depicted tools such as laparoscopic or endoscopic tools for minimally invasive surgery. In view of this it would also be desirable to provide a device which is capable of being adapted to different applications.

The interactive performance of the PHANToM™ device relies on a single point of interaction with the virtual or tele-manipulated environment. Attempts have been made to introduce multiple points of interaction through addition of grasping mechanisms with force feedback to a haptic device. This approach allows for the extension of grasping with force feedback, the addition of motion and force feedback with three degrees of freedom. Typically such additions may comprise the drive motor(s) and pulley system(s) required for the gripping function to be included on the end of the haptic device which adds extra weight to the system and results in diminishing overall performance.

One potential solution to the above problem, in relation to a single idealized pair of "soft fingers" (ie a point contact with friction) where no internal torsion is exerted on an object during grasping, is to use a single drive motor and cable pulley system which sits on the end of a haptic device[1]. A single drive motor and cable pulley system relates to both fingertips in this design as the second fingertip feels the reaction force of the grasped object (it is the same as squeezing a golf ball between a thumb and index finger, the force felt on both fingers is the same). However, it is not clearly evident that the position of the unactuated finger is tracked. Attached to the pulley is a finger interaction point which is driven by a motor and cable system, depending on the appendage that is used to interact with the device, i.e. the thumb or index finger interface. The other finger interface (ie an opposed finger for gripping) is directly coupled to the actuated interface, which means that both fingers will move an equal distance from each other and the haptic device. Consequently, to reduce the weight of the grasping interface, a small drive motor is used and as a result the maximum force of the system is relatively small. This design may limit the finger interfaces by not allowing the user to experience individual external forces applied to each finger. This design may also be limited in that no torque can be exhibited to the user which ultimately limits the interactive experience for a user and the applicability of the device.

The aforementioned problems are not intended to be an exhaustive reference, but rather an indication, in the view of the inventor, as to the general weaknesses that current systems have encountered, which tend to weaken the effectiveness of previously developed grasping interfaces.

By way of example, FIG. 1a illustrates a known haptic interface system 1a having a wheeled or tracked platform 2a and a commercially available haptic device 3a such as the above noted PHANToM™ interface. The haptic device 3a has a probe 5a. Inputs to the system 1a in the form of operator hand movements of the probe 5a are translated into control inputs to the platform 2a which are transmitted over the communication channel 4a. Application specific haptic augmentation is in turn transmitted to the operator over channel 6a.

For example, the operator may control the motion of the platform 2a as it explores a remote environment, aided with images from an on-board camera. When the platform is likely to collide with an obstacle then haptic augmentation in the form of appropriate forces are provided to the operator to indicate to the operator that the robot is about to collide with an obstacle.

The inventor has also identified the following related art. The simulation of motion may be broken down generally into two components, namely, fundamental forces of motion and, the body's sensation or experience during motion. With respect to the first component of fundamental forces of motion, most simulators are more or less stationary and have no momentum therefore they must produce a force that moves a user to simulate a change in direction or momentum for the simulated motion. In general, the fundamental movements of a simulator may be considered as pitch (tilting up or down), roll (sideways rolling to the left or right) and, yaw (turning left or right within a horizontal plane). It is desirable that a sophisticated simulator may also facilitate vertical, lateral and longitudinal displacement, which effectively provides six degrees of freedom to the system. With respect to the second component of the body's sensation of motion, it can be said that this relates to the brain's interpretation of the experience through the bodily senses. The inner ear and vision are considered to play a major role. Sound may also have an influence on the brain's interpretation of motion. Also, touch or tactile sensation may provide a means of establishing an interpreted reality of motion. Tactile sensation is generally provided by motion simulators by way of audio drivers or vibration generators operatively associated with the structure of the simulator itself.

There are several commercial motion simulators available such as flight simulators. An example of simulators are those offered by Moog, Inc and its affiliated companies throughout the world using a hydraulic based servo actuator configured in a closed chain kinematic manner, however, the motion and work envelope of these systems may be very limited. Available simulator technology may use a 'pod' as the simulated operator space to represent the physical environment between the operator and the simulated system. In motion enabled simulation systems this pod may be mounted on a motion platform, and visual cues and motion commands may be generated in response to the user's operation of the controls and the simulated system's interaction with the virtual environment.

Most motion simulator systems whether flight, car, tank simulator etc, have one weakness in common. Their lack of full body motions through mechanical constraints, for instance, is still a topic of challenging research for virtual environment technology. In most cases existing technology may use a "cabin" that represents the physical vehicle and its controls. The cabin may be ordinarily mounted on a motion platform, and virtual window displays and motion commands may be generated in response to the user's operation of the controls. These systems also tend to be specialized to a particular application.

In recent years there has also been the exploitation of such technology by the entertainment industry and adventure rides. However, for many kinds of virtual environment applications, more active self-motion may be required. The major challenges for full body motion in a virtual environment arise whenever we have locomotion through a large virtual space, locomotion over varying surface characteristics, and motion in a direction other than horizontal are required. Thus, the replication or simulation of full body motions represents a challenging topic of research in virtual environment technology.

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure and claims herein.

SUMMARY OF INVENTION

An object of the embodiments described herein is to alleviate at least one disadvantage associated with related art as discussed hereinabove.

In one aspect of a first embodiment described herein there is provided a method of providing feedback to at least two user contact points of a haptic interface, the method comprising the steps of:

remotely coupling a first and at least one second feedback actuator in operative association with a haptic device;

actuating the first and at least one second feedback actuator independently of each other;

distributing feedback from the first and the at least one second feedback actuator to a first and at least one second user contact point, respectively.

The step of remotely coupling may comprise the step of guiding at least one actuator cable to a central body in communication with the terminal end of a haptic device. In one form, the step of guiding may be performed by attaching an actuator cable support plate to a central body in communication with the terminal end of a haptic device. The central body may be used to accommodate the bearings of the pulleys, and effectively provide a means of attachment for the cable support plate. The central body also provides an attachment point to the end of a haptic device. Through an addition of another pulley, by way of modifying the central body, another finger contact point may be added.

A fixing coupling may be used to facilitate the attaching of the contact points to the central body.

Preferably, the step of actuating comprises the steps of providing at least one pulley and cable system for each actuator wherein each system is adapted for providing bi-directional motion of its respective pulley about an axis of the central body.

It is also preferable that the step of distributing feedback comprises the step of operatively attaching each user contact point to its respective feedback actuator with at least one arm member. The at least one arm member may be operatively attached to a respective pulley. The step of distributing feedback may comprise applying one or more of internal and external feedback to a user's fingertips.

In another aspect of the first embodiment described herein there is provided apparatus for providing feedback to at least two user contact points of a haptic interface, comprising:

remote coupling means for remotely coupling a first and at least one second feedback actuator in operative association with a haptic device;

independent actuating means for actuating the first and at least one second feedback actuators independently of each other;

feedback distribution means for distributing feedback from the first and the at least one second feedback actuator to a first and at least one second user contact point, respectively.

Accordingly, the remote coupling means may comprise:

guide means for guiding at least one actuator cable to a central body in communication with the terminal end of a haptic device. The guide means may comprise, in one form, an actuator cable support plate attached to a central body in communication with the terminal end of a haptic device. A fixing coupling may be used to facilitate the attachment of the actuator cable support plate to the central body. The independent actuating means may comprise at least one pulley and cable system for each actuator wherein each system is adapted for providing bi-directional motion of its respective pulley about an axis of the central body. The feedback distribution means may comprise at least one arm member for operatively coupling each user contact point to its respective feedback actuator. The at least one arm member may be operatively attached to a respective pulley. The feedback distribution means may comprise a finger pad and a finger strap for applying one or more of internal and external feedback to a user's fingertips.

Preferably, the feedback comprises one or more of:

tactile sensation;

at least one kinesthetic force.

In at least one preferred aspect of the first embodiment there is provided apparatus adapted to provide feedback to at least two user contact points of a haptic interface, said apparatus comprising:

processor means adapted to operate in accordance with a predetermined instruction set, said apparatus, in conjunction with said instruction set, being adapted to perform the method steps as disclosed herein.

Preferred aspects of the first embodiment of the present invention may be comprised of a computer program product, which in turn comprises:

a computer usable medium having computer readable program code and computer readable system code embodied on said medium for providing feedback to at least two user contact points of a haptic interface within a data processing system, said computer program product comprising:

computer readable code within said computer usable medium for performing the steps of any one of the methods steps as herein disclosed.

A feature that the first embodiment of the current invention uses is sheathed actuator cables, which are routed outside the grasping interface and are not attached to the haptic device itself. This allows for application to a wide range of haptic devices. An additional feature of the first embodiment of the current invention is that it employs a plurality of finger interfaces, e.g. two fingers which are independent from each other. Another feature of the first herebelow described embodiment of the present invention is to provide torque feedback to the user which results in enhanced interactivity between the user and the virtual or tele-manipulated environment.

It is therefore desirable, in accordance with the essence of the first embodiment of the present invention, to provide a haptic grasping interface, which increases the number of force feedback degrees of freedom on the end of a haptic device, with its actuators mounted remotely to the grasping interface, e.g. in a box under the haptic device therefore making it a complete system. Such a grasping interface would have the advantage of being easily transferable between different types of haptic devices. Such a device would also improve the current interactive performance of the commercially available lower cost haptic devices and broaden their application.

The applicant sees a requirement to fill a void in the current commercial haptics interfaces; and the first described embodiment herein is based on developing an extension to the current devices which will provide the user with the ability to grasp and manipulate objects in complex virtual environments.

In a further aspect of the first described embodiment herein there is a method of providing feedback to at least two user contact points of a remote interface, the method comprising the steps of:

remotely coupling a first and at least one second feedback actuator in operative association with a remote device;

actuating the first and at least one second feedback actuators independently of each other;

distributing feedback from the first and the at least one second feedback actuator to first and at least one second user contact points, respectively.

In yet another aspect of the first described embodiment herein there is apparatus for providing feedback to at least two user contact points of a remote interface, comprising:

remote coupling means for remotely coupling a first and at least one second feedback actuator in operative association with a remote device;

independent actuating means for actuating the first and at least one second feedback actuators independently of each other;

feedback distribution means for distributing feedback from the first and the at least one second feedback actuator to a first and at least one second user contact point, respectively.

In one aspect of a second embodiment described herein there is provided a method of simulating motion, the method comprising the steps of:

providing at least six degrees of freedom of movement to a user by operatively associating an anthropomorphic robot arm with a user pod for receiving the user;

providing haptic feedback to the user in correspondence with the movement of the user pod.

Preferably, the method further comprises one or a combination of the following steps of:

providing a user with a perception of the simulated environment; and, tracking the motion of the user;

The step of providing haptic feedback may comprise feeding back the tracked motion of the user to an interface for adapting the user perception of the simulated environment. Accordingly, it is preferable that the step of feeding back comprises transforming a user view by a negative amount that compliments the tracked motion. The tracked motion comprises one or a combination of: position in Cartesian coordinates X, Y and Z; and, orientation comprising yaw, pitch and roll. At least one major motion cue generated by the robot arm and corresponding to the position and/or orientation of the pod may be provided as well as at least one minor motion cue generated by at least one haptic actuator provided in the pod and operatively associated with the user, and; at least one force feedback cue generated by the at least one haptic actuator for simulating physical phenomena encountered by the user in the simulated environment.

Software control programmed to relate a plurality of simulated environment applications may be operatively associated with a motion controller of the robot arm and this operative association may comprise generating user control signals associated with pod devices controlled by the user and comprising motion parameters and, communicating the control signals to the software control for triggering motion commands for the robot arm.

In another aspect of the second embodiment described herein there is provided motion simulator apparatus comprising, in combination:

an anthropomorphic robot arm adapted to provide at least six degrees of freedom of movement;

a user pod for receiving a user said user pod being operatively connected to the anthropomorphic robot arm;

a haptic interface operatively associated with the user pod for providing haptic feedback to the user in correspondence with the movement of the user pod.

The apparatus may also further comprise a user control interface operatively associated with the pod and robot arm for providing a user with a perception of the simulated environment; and, tracking devices for tracking the motion of the user. The haptic interface is preferably adapted for feeding back the tracked motion of the user to the user control interface for adapting the user's perception of the simulated environment.

Aspects of the second described embodiment of the present invention also comprise apparatus adapted to simulate motion, said apparatus comprising:

processor means adapted to operate in accordance with a predetermined instruction set, said apparatus, in conjunction with said instruction set, being adapted to perform one or a combination of the method steps as disclosed herein.

In a further aspect of the second described embodiment of the present invention there is a computer program product provided comprising:

a computer usable medium having computer readable program code and computer readable system code embodied on said medium for simulating motion within a data processing system, said computer program product comprising:

computer readable code within said computer usable medium for performing one or a combination of the method steps disclosed herein.

In essence, aspects of the second embodiment of the present invention stem from the realization that providing a full body motion through the X, Y, and Z planes of the Cartesian coordinate system at any orientation in combination with haptic feedback, the amount of physical realism or suspension of disbelief of a user can be significantly established by the resultant faithful motion cues that become available. Accordingly, the second embodiment described herein may be considered to provide a Universal Motion Simulator (UMS).

A number of advantages are provided by the second embodiment described herein such as:

The complete system may increase the amount of physical realism, or suspension of disbelief that can be experienced by the user as a direct result of more realistic and faithful motion cues.

It may eliminate motion sickness problems to users as a result of reduced reliance on alignment of visual and motion cues through combination of translational motion to rotary motion and the use of the same size turning radius when changing directions The accuracy of the human motion simulation models can be highly improved.

Additionally, one or several research projects may be supported by this UMS facility and aimed on increasing vehicle safety and preventing vehicle accidents, thus the proposed simulator may also offer a significant social value.

The haptically enabled UMS facility may provide a wide variety of advanced simulated motions to significantly enhance the capabilities and research quality of collaborative research programmes.

Particular areas of research may be supported by the preferred UMS facility, such as the following:

Electronic stability control in vehicles and awareness of loss-of-control situations Drivers fatigue analysis Improving safety of all terrain vehicles on farms Effects of motion on speed and accuracy of the driver reach Real-time vehicle dynamics In contrast to certain related art systems described above, the present specification discloses, in accordance with a third embodiment, a new use for haptic augmentation which we refer to as "input-control haptic augmentation".

According to one aspect, a third embodiment of the present invention provides a system in which haptic augmentation to an operator comprises a first type of haptic augmentation which indicates to the operator the state of a control input to a controlled device.

It is preferred that the controlled device of the third described embodiment comprises a mobile platform.

It is preferred that the control input comprises at least one of:

a commanded linear velocity; and a commanded angular velocity.

It is preferred that the first type of haptic augmentation to the operator comprises a virtually-rendered three-dimensional surface.

It is preferred that the virtually-rendered three-dimensional surface:

in a first dimension, represents a first component of the control input;

in a second dimension, represents a second component of the control input; and in which both the first and second components of the control input are monotonically increasing functions of the value of the third dimension.

It is also preferred that the virtually-rendered three-dimensional surface is an inverted, hollow cone in which the height of the inverted cone extends in the third dimension.

It is preferred that the haptic augmentation to the operator further comprises a second type of haptic augmentation.

It is preferred that the second type of augmentation is application specific haptic augmentation. In such a case, it is also preferred that both the first type and the second type of haptic augmentation are rendered to the operator through one virtually rendered surface.

According to another aspect, the third described embodiment of the present invention provides a system in which haptic augmentation to an operator comprises a first type of haptic augmentation and a second type of haptic augmentation. In this case, it is preferred that the first type of haptic augmentation indicates to the operator the state of a control input to a controlled device.

Other aspects of the third described embodiment of the present invention provide corresponding processes, and implementing software for those processes embodied in machine-readable substrates.

Throughout this specification, including the claims, we use the terms:

"ASHA" as an acronym for "application-specific haptic augmentation"; and

"ICHA" as an acronym for "input-control haptic augmentation".

Other aspects and preferred features of embodiments are disclosed in the specification and/or defined in the appended claims, forming a part of this description.

Further scope of applicability of the present embodiments will become apparent from the detailed description given hereinafter. However, it should be understood that the detailed description and specific examples, while indicating preferred embodiments, are given by way of illustration only, since various changes and modifications within the spirit and scope of the disclosure herein will become apparent to those skilled in the art from this detailed description.

BRIEF DESCRIPTION OF THE DRAWINGS

Other features and advantages of one or more preferred embodiments will be readily apparent to one of ordinary skill in the art from the following written description with reference to and, used in conjunction with, the accompanying drawings, which are given by way of illustration only, and thus are not limiting to the scope of the present invention, and in which:

FIG. 10b is a schematic block diagram of the simulator of FIGS. 10 and 10a;

FIGS. 17 and 17a illustrate details of the art of FIG. 1a; and

DESCRIPTION OF PREFERRED EMBODIMENT

A first embodiment relates to a method and apparatus for providing a haptic interface. In one particular form the present embodiment relates to a method and apparatus for facilitating gripping of objects in a haptic interface. It will be convenient to hereinafter describe the embodiment in relation to the use of apparatus to provide a force reflecting haptic gripper interface to a plurality of finger interaction points, however, it should be appreciated that the present invention is not limited to that application, only.

In developing the first described embodiment, two issues were considered for resolution. Firstly, there was the definition of the number of virtual fingertip points (avatars) that are required to have complete form closure (stable grasp) for the different applications of a remote gripper. Secondly there is the design of a human interface which can accommodate these multi-point requirements. One application of considerable interest is medical training such as minimally invasive surgery. This area of haptics is becoming ever increasingly plausible due to the fact that the haptic research community is contributing a great deal to this area, In another field, military applications such as tele-operation within dangerous environments allows for the safe assessment and disarmament of sensitive and hazardous objects. Industry applications such as operator training allow for the safe education and training of employees within industry, without being prematurely exposed to dangerous work environments.

In this first preferred embodiment, a two finger device has been considered as it allows for the use of minimal sensors and actuators to establish form closure based on a grasp between the thumb and index finger. With fewer sensors and actuators, the device can be attached to an existing 3 DOF device and therefore provide grasping and manipulation with force feedback while maintaining maximum possible transparency. A benefit of this two finger design is that it allows for a torsional force to be applied to the user about the grasp axis, which results in an extra axis with force feedback.

Figure 1:
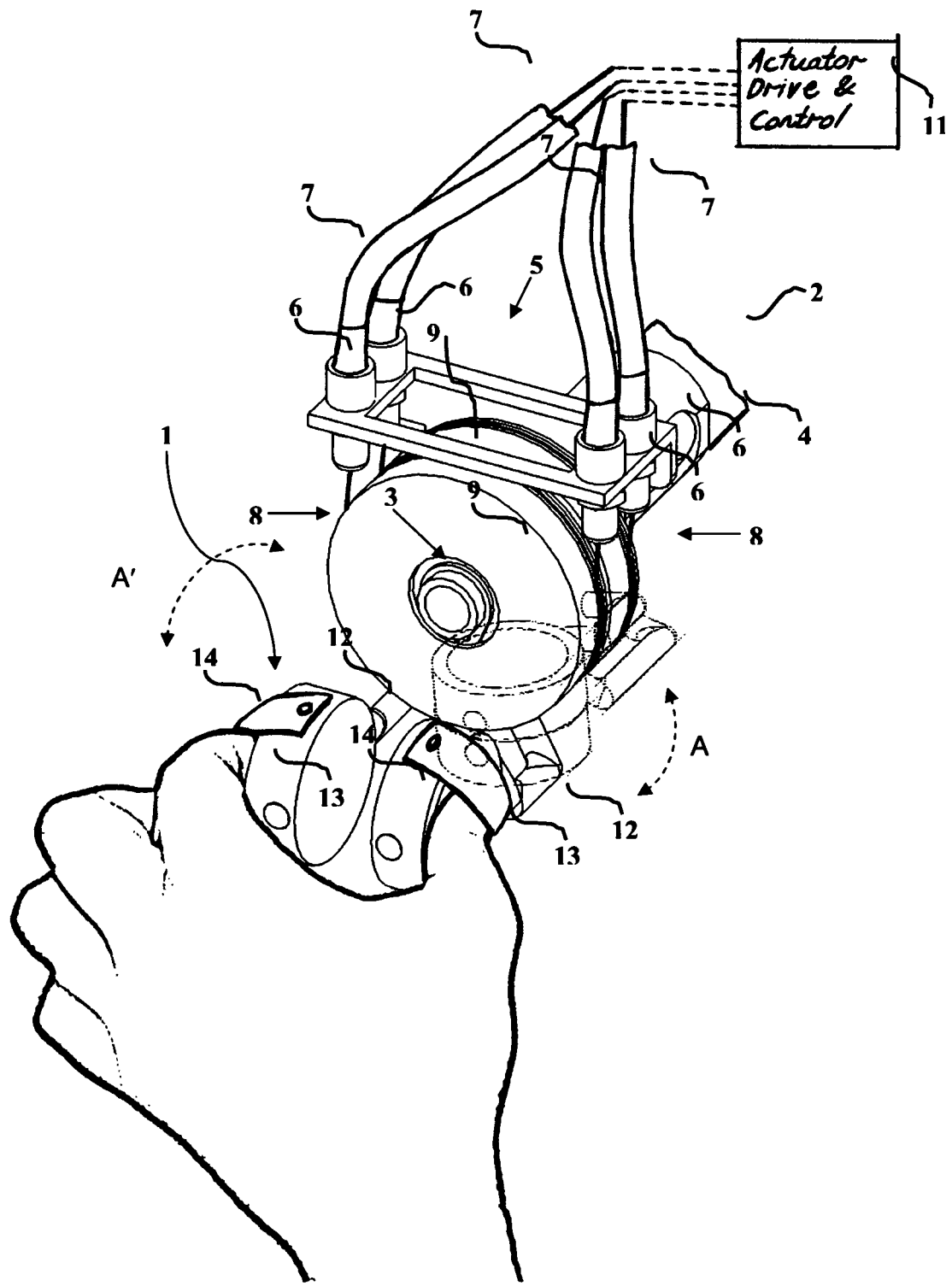
FIG. 1 is a perspective view of a haptic grasping interface in accordance with a first preferred embodiment described herein.
Figure 2:
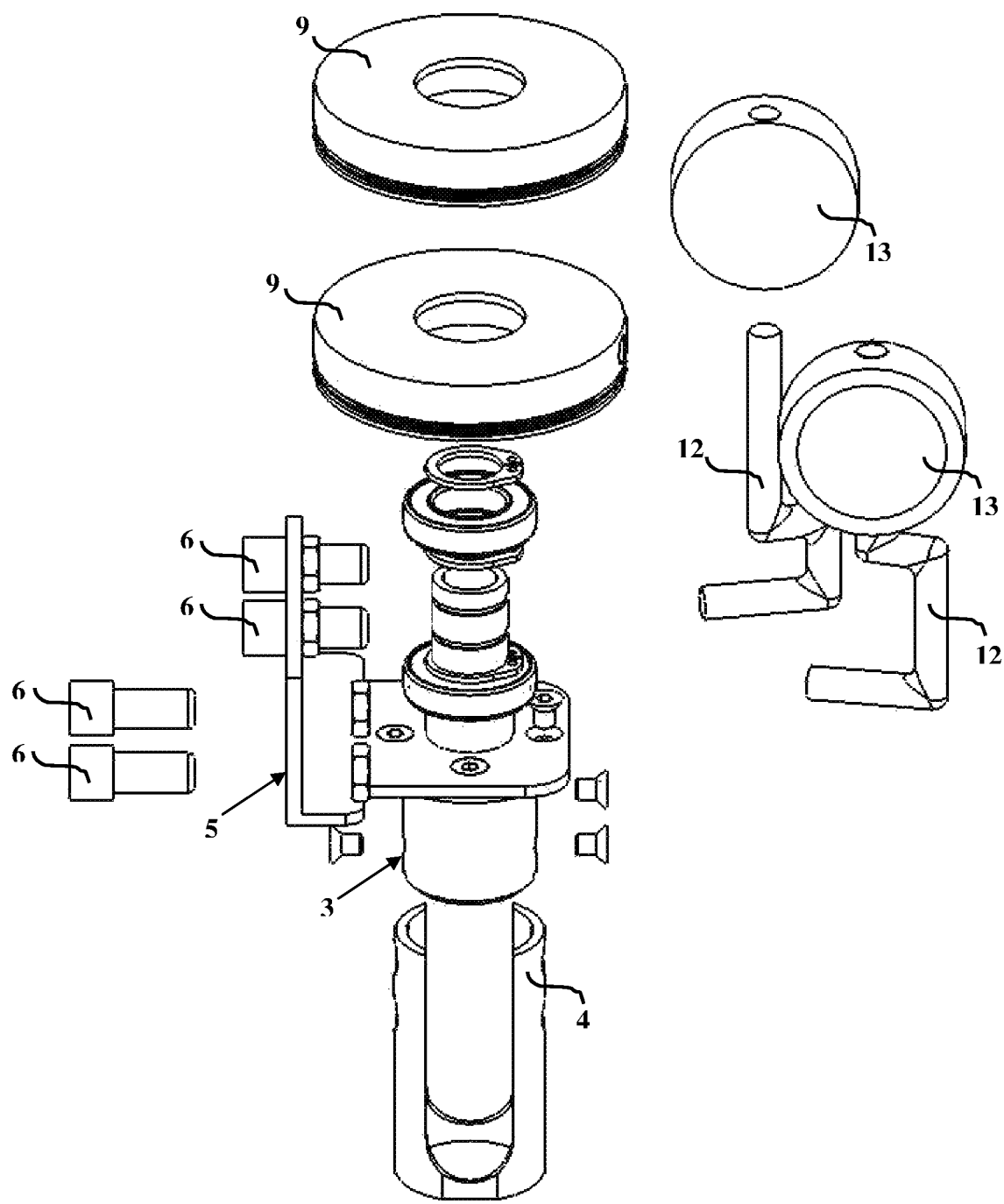
FIG. 2 is an exploded perspective view of a haptic grasping interface in accordance with the first preferred embodiment described herein.
Figure 3:
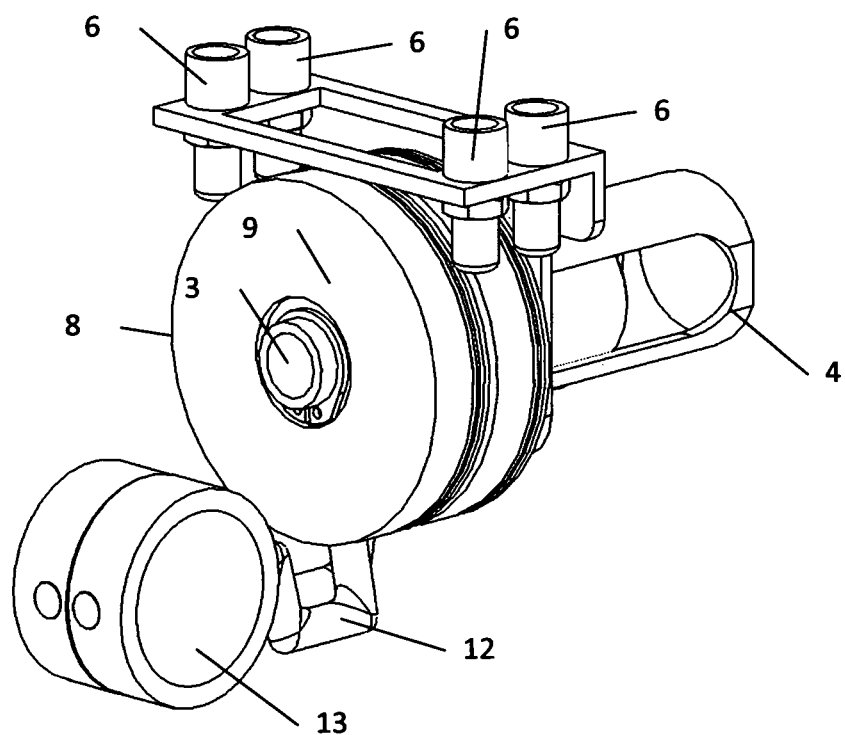
FIG. 3 is another perspective view of a haptic grasping interface in accordance with the first preferred embodiment described herein.
Figure 4:
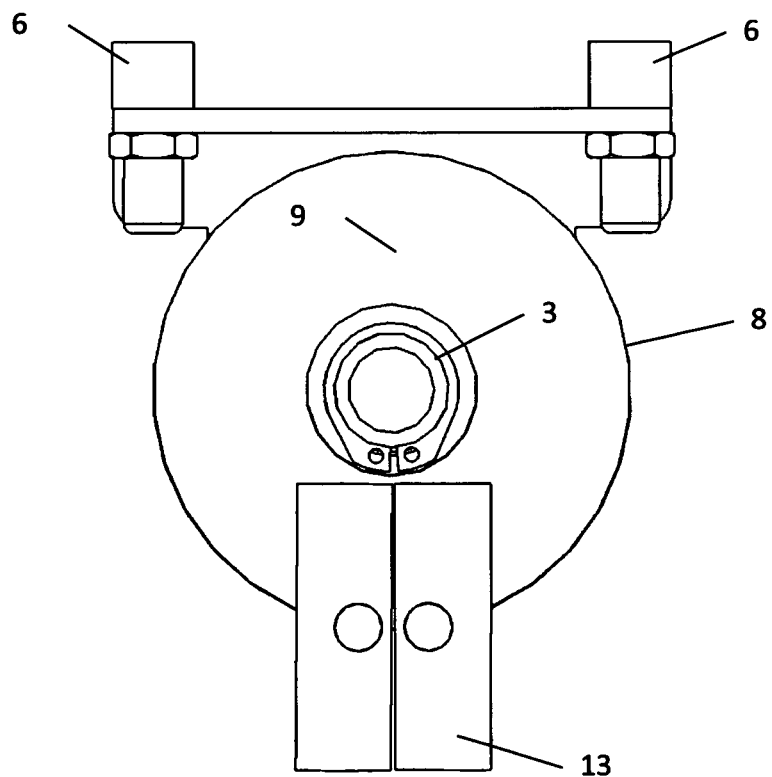
FIG. 4 is a front view of a haptic grasping interface in accordance with the first preferred embodiment described herein.
Figure 5:
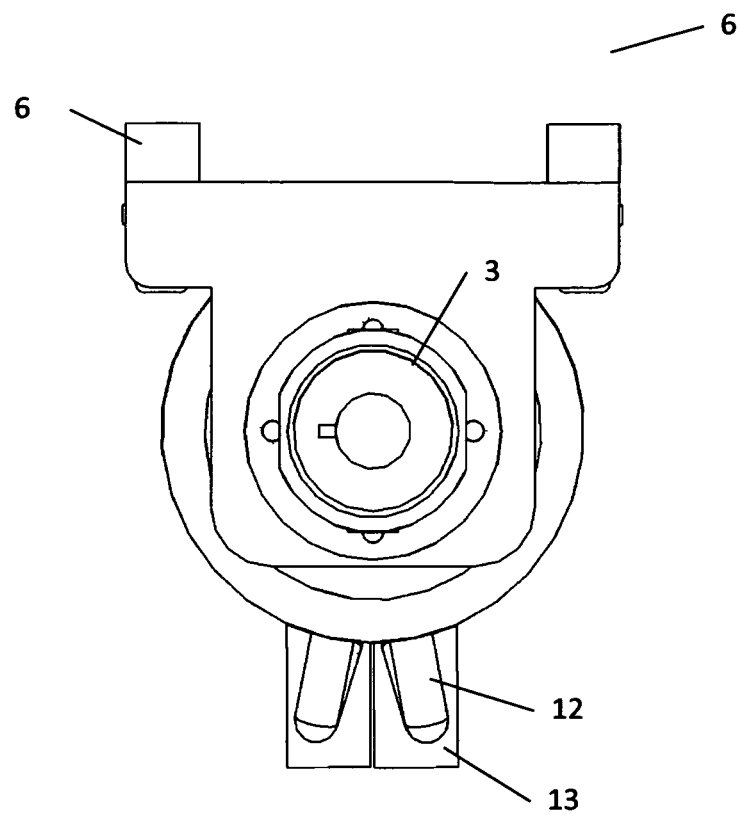
FIG. 5 is a back view of a haptic grasping interface in accordance with the first preferred embodiment described herein.
Figure 6:
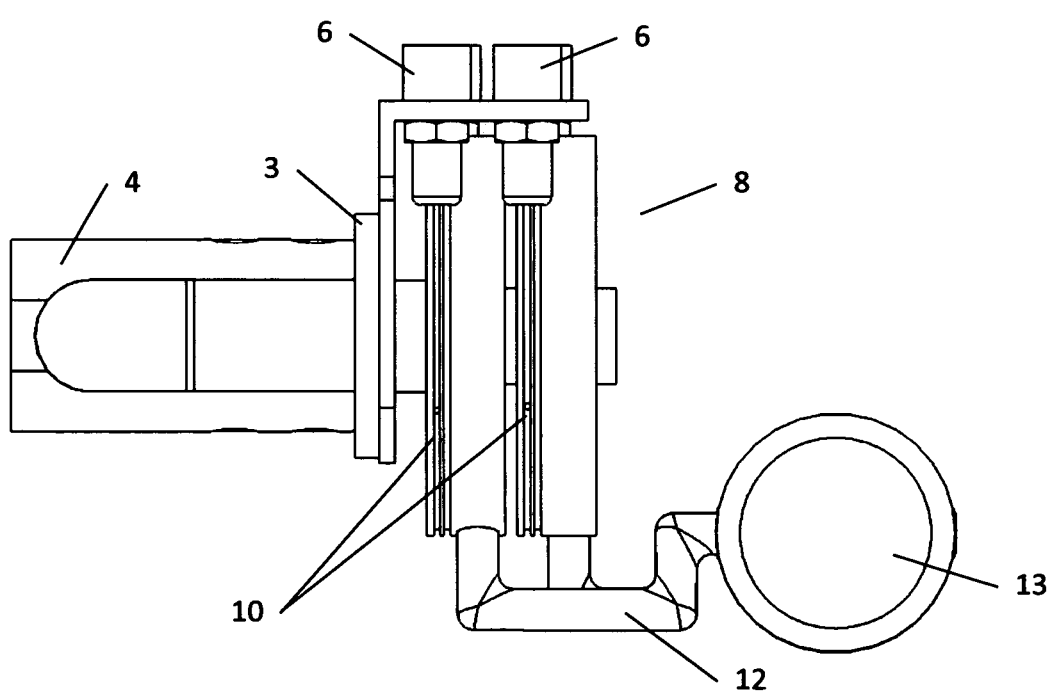
FIG. 6 is a side view of a haptic grasping interface in accordance with the first preferred embodiment described herein.
Figure 7:
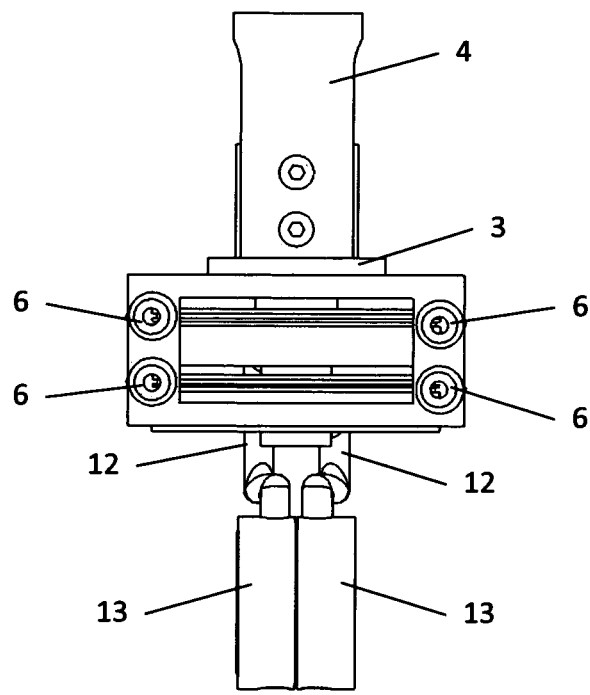
FIG. 7 is a top view of a haptic grasping interface in accordance with the first preferred embodiment described herein.
Figure 8:
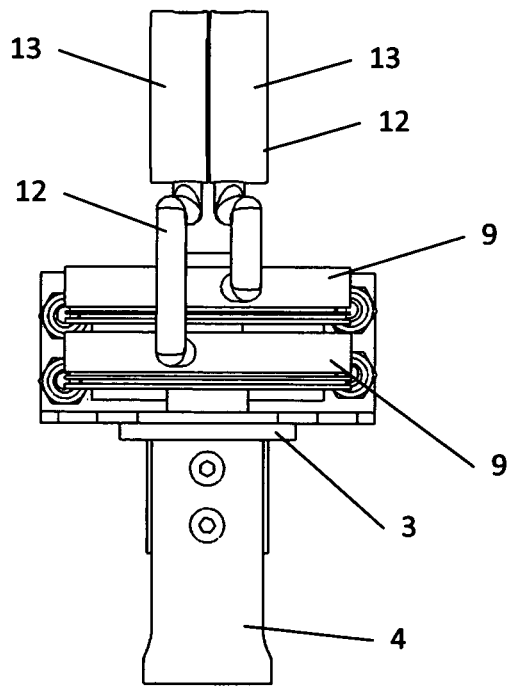
FIG. 8 is a bottom view of a haptic grasping interface in accordance with the first preferred embodiment described herein.

A perspective view of a haptic interface in accordance with the first embodiment is shown in FIG. 1. The interface shown has two finger grasping contact points 13, which are systematically referred to in general as gripper 1. Each contact point is independent from the other and consequently exhibits individual forces in accordance with this preferred embodiment of the present invention. The gripper 1 is attached to the terminal end of a haptic device 2 by a central body 3 and fixing coupling 4, as is further illustrated with respect to FIG. 2. The central body 3 may be used to accommodate the bearings of pulleys 9, and effectively provide a means of attachment for a cable support plate 5. The central body 3 also provides an attachment point to the end of a haptic device 2. Through an addition of another pulley 9, by way of modifying the central body 3, another finger contact point 13 may be added. The fixing coupling 4 is used to, attach the contact points 13 to, in one example case the Phantom Omni™, but it can be modified to be attached to any haptic device 2.

With reference to FIGS. 1 to 8, where like reference numerals are used for corresponding features, attached to the central body 3 is a cable support plate 5, containing four sheath-end support members 6 and providing horizontal support to two sheathed cables 7. One cable 7 for each of the fingers 8 enters into openings (see 6 in the top view of FIG. 7) of the sheath-end support members 6 and is wound around a pulley 9, where numeral '8' is used in reference to each cable essentially driving a single finger bi-directionally. Each finger 8 comprises a pulley 9, an arm and support pad.

Each pulley 9 has an opening 10 (shown in FIG. 6) in the channels of the pulleys for terminating the cable 7 to provide bi-directional motion of the pulley 9 about the axis of the central body 3. Each cable 7 has two sheaths that are used to assist in providing the bi-directional motion to pulley 9 and the guidance between the motor actuators in an actuator drive and control mechanism 11, shown schematically in FIG. 1, which is mounted remotely from the gripper 1, e.g. in a box under the haptic device.

An angular arm member 12 is attached to the pulley 9 and is parallel to the central body 3 to distribute feedback, namely tactile sensation or, more preferably forces to the user's fingertips. These forces are distributed via the finger contact point 13 which is mounted to the angular arm member 12 for rotational movement about the angular arm member 12. Arrow A, depicted in FIG. 1 represents the rotational motion about the axis of the central body 3 so as to apply a torque about this axis. Further, arrow A' is shown representing how each finger pad is able to rotate around the axis of each arm member 12 which may allow users' fingers to move in a comfortable position especially during grasping and rotation exercises. The finger contact point 13 contains a finger strap 14 that ties the users thumb and forefinger to the finger contact point 13 and as a result applies internal and external feedback or forces to the user's fingertips.

It would be appreciated by the person skilled in the art that practical incarnations of the first embodiment may find application in, for example, environments that are suitable for providing telepresence although this is not to be taken as a limiting example of use. In telepresence applications, the environment that a user experiences may be real but too awkward or dangerous too actually visit. Usually some form or robot or maybe just a robotic arm may carry sensors that witness the environment and send information back to the user. These environments may relate to fields such as, for example, fire fighting, surgery and exploring extremely remote environments like Mars by robot and a benefit of such telepresence systems is that they can be used to extend a user's senses beyond their normal capabilities. For example, it is envisaged that infrared or ultraviolet sensors can have their outputs remapped into the visible spectrum to allow a user to see events that may normally be invisible and, robots fitted with radiation counters can be used to explore inside the parts of nuclear power stations where it is unsafe for humans to be. For instance, the robot can check for damaged areas and report the level of radiation without endangering the operator.

A second embodiment relates to motion simulation. It will be convenient to hereinafter describe the second embodiment in relation to the use of anthropomorphic robotic apparatus to provide a haptically enabled universal motion simulator platform for facilitating vehicle simulations to support training and/or research, however, it should be appreciated that the present invention is not limited to that application, only.

In general, the field of haptics relates to the development, testing, and refinement of tactile and force feedback devices and supporting software that permit users to sense, or "feel", and manipulate virtual objects with respect to such attributes as shape, weight, surface textures, temperature and so on.

Generally, it may be stated that of the five senses, namely, sight, sound, smell, touch and taste, it is sight, sound and touch that provide the most information about an environment, where the other senses are more subtle.

In humans, tactile sensing is generally achieved by way of receptor cells located near the surface of the skin, the highest density of which may be found in the hands. These receptors can perceive vibrations of up to about 300 Hz. Therefore, in a haptic interface tactile feedback may generally involve relatively high frequency sensations applied in the proximity of the surface of the skin, usually in response to contact, as such, between a user and a virtual object. In contrast, the human sensing of forces may be considered as more kinesthetic in nature, and may ordinarily be achieved by receptors situated deeper in the body. These receptors are located in muscles, tendons and joints and may be stimulated by movement and loading of a user's body parts. The stimulus frequency of these receptors may be much lower, lying in the range of about 0-10 Hz. Accordingly, in a haptic interface force feedback may comprise artificial forces exerted directly onto the user from some external source.

Therefore, it is considered there are two aspects to the sense of touch; firstly that which provides kinesthetic information and secondly that which provides tactile information. The kinesthetic information that a user perceives about an object are coarse properties such as its position in space, and whether the surfaces are deformable or resilient to touch. Tactile information may be considered to convey the texture or roughness of an object being 'touched'. It is desirable that both types of 'touching' information be used in a realistic haptic interface.

Haptic Interfaces are systems that enable a user to interact with a virtual environment by sensing a user's movements and then relaying this information to the virtual environment. Along side this interaction, sensory feedback is provided to the user which reflects their actions within this environment, and as a result, it is the design of the haptic interface which conveys the level of sensory interactivity between the user and the virtual environment.

Figure 9:
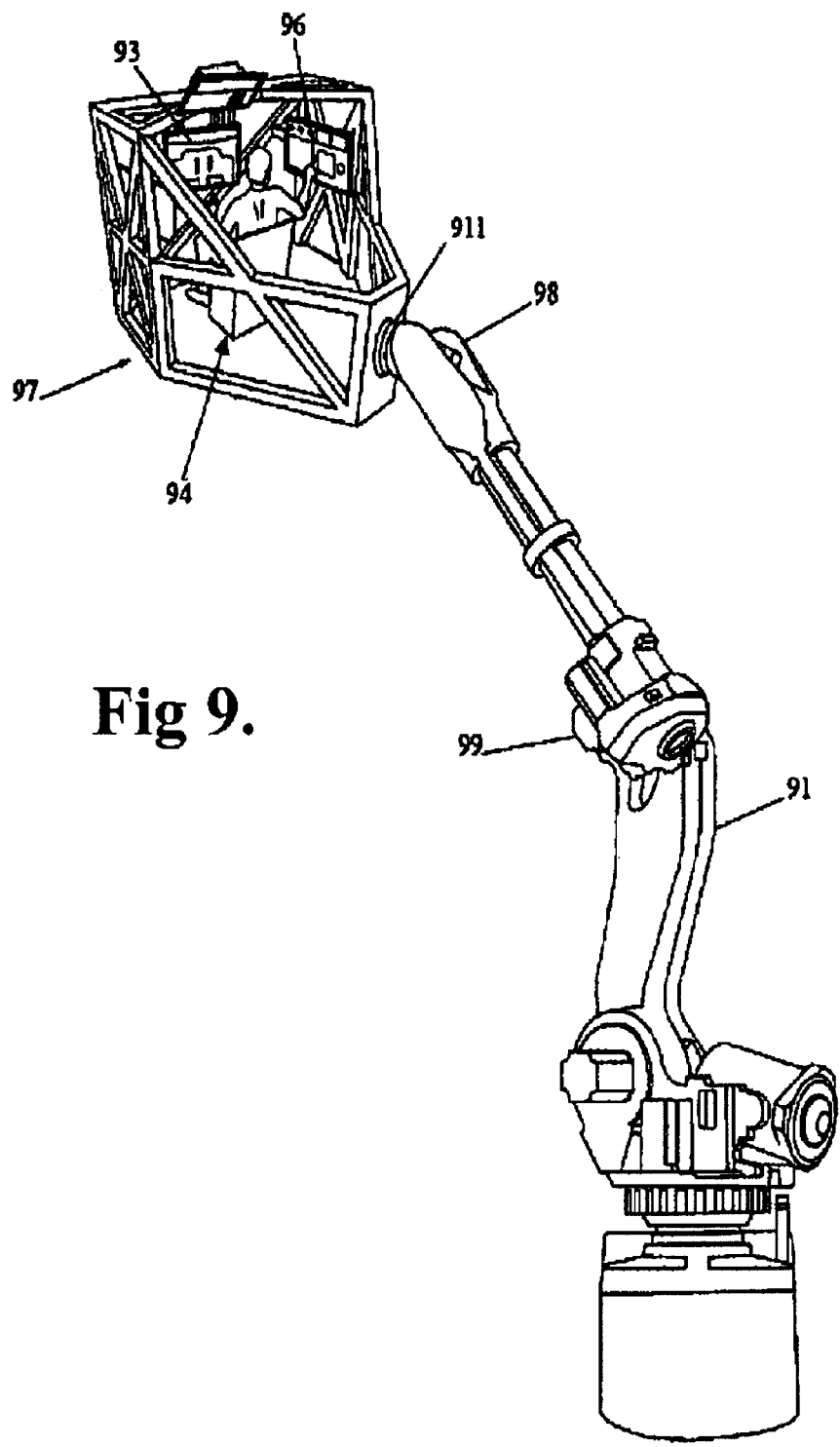
FIG. 9 is a perspective view of a universal motion simulator in accordance with a second preferred embodiment described herein.

In accordance with particularly preferred aspects of the second embodiment, there is provided a haptically enabled Universal Motion Simulator (UMS) as shown in FIG. 9. The preferred UMS of FIG. 9 is a platform for providing research and/or training via motion simulation which comprises, in combination, the following technologies:

High payload anthropomorphic robot 91;
Tracking devices for human motion capturing 1112 (best shown in FIGS. 11 and 12);
Visual display systems 93;
Haptic system 94;
3D Audio systems 96;
Associated simulation Application programming interfaces (API) not shown;
Simulation motion control software and hardware, not shown.

In the preferred UMS platform a modified pod 97 is operatively attached to the end wrist 98 of the robot arm 99 and may be in the same configuration as commercially available motion simulators, such as that disclosed U.S. Pat. No. 6,776,722 in the name of De-Gol and assigned to Robocoaster Limited. The device disclosed by De-Gol is marketed as the Robocoaster™.

The pod 97 is attached to the wrist 98 of the anthropomorphic robot 91 via appropriate couplings such as for example a mounting flange 911. The pod 97 may thus in effect become the end effector (tool or gripper) part of the robot 91. The robot 91 may be adapted to place or position the pod 97 in a Cartesian coordinate system anywhere in X, Y and Z plane at any orientation.

Figure 11:
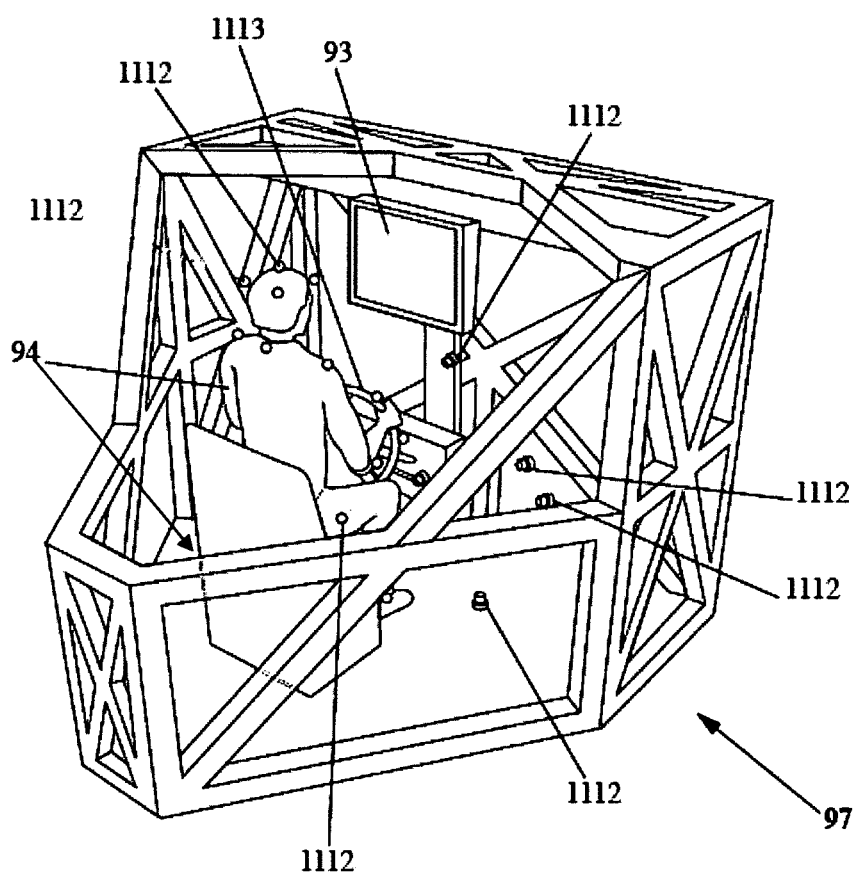
FIG. 11 is another perspective view of a modified pod for use with a universal motion simulator in accordance with a second preferred embodiment described herein.
Figure 12:
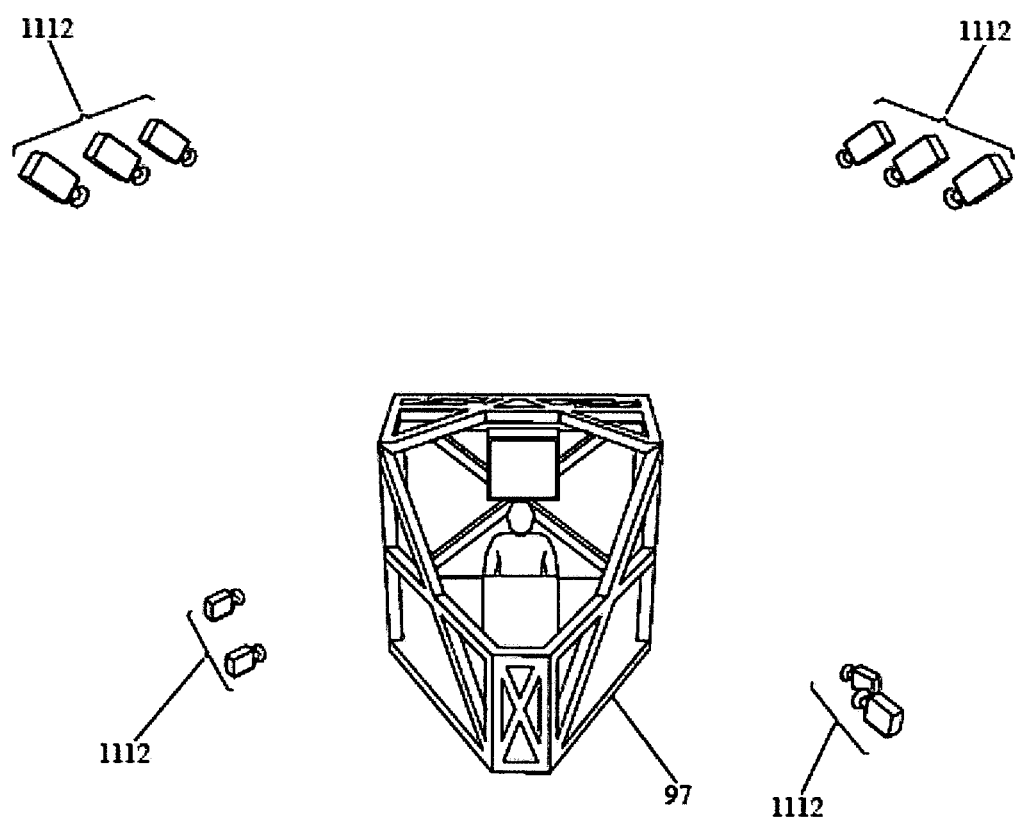
FIG. 12 is another perspective view of a modified pod for use with a universal motion simulator showing motion capture apparatus in accordance with a second preferred embodiment described herein.

The pod 97 may comprise haptic controls (not shown) forming part of the user interfaces for a lightweight 3D display headset (not shown) such as a head mounted display (HMD) to be worn by the user to view the simulated world and 3D audio systems to provide aural cues. The HMD may be equipped with ear phones for audio input. The virtual world can be generated by suitable custom built software such as, for example, game development engines for creating virtual worlds as would be understood by the person skilled in the art may be used for this purpose. Accordingly, views of such virtual worlds or environments may be displayed on to the HMD preferably using sequential stereo for 3D depth perception to the user. Depending on the virtual world, aural cues may be generated and can be triggered according to different events that may occur within the virtual world to provide a true sense of realism and immersion for the user. To keep the motion of the UMS synchronized with the human visual system and for any dynamic biomechanical analyses, tracking capabilities may be introduced by way of magnetic, electromagnetic and/or optical trackers 1112 as shown in FIGS. 11 and 12.

The magnetic and optical trackers 1112 with their respective capabilities may complement each other and may generate accurate orientation and positional information at any instant of time with respect to the orientation and position of the pod 97. At any instant of time depending on the position (in Cartesian coordinates i.e. X, Y, Z) and orientation (in terms of yaw, pitch and role) of the pod 97, the view of the user may be transformed by a negative amount of the same values of X, Y, Z, yaw, pitch and role to keep the UMS synchronized with the user's visual system.

Two parallel motion cues, defining different motion patterns, may be generated, simultaneously, at the occurrence of any event, within the simulation environment and can be defined as major and minor motion cues, accordingly. The major motion cues may define the overall change in position and orientation of the pod 97 from one point in space to the other, such as, in a car driving simulation, the change in position and orientation of the car from time instant t to t+ε with respect to the road, where ε defines a small change in time. The major motion cues may be generated by the robot arm 99 and may define the overall position and orientation of the pod 97. On the other hand, the minor motion cues responsible for more detailed but low intensity motion sensations for the user, may be generated within the pod 97 preferably using haptics actuators 94 as shown in FIG. 10*c*. The haptic actuators demonstrated in FIG. 10*c* are preferably two PHANToM™ Omni™'s, however there are many different combinations and arrangements of the haptic actuators that may be incorporated within the pod 97 as would be recognised by the person skilled in the art.

The haptics actuators 94 may also be responsible for producing force feedback cues to mimic real physical phenomena such as leaning outside with vibrations while making a turn on a rough surface road.

Thus the proposed UMS will provide a significant advancement in the research of simulated training and testing of operators and systems. Furthermore, it may eliminate motion sickness problems to users as a result of reduced reliance on alignment of visual and motion cues through combination of translational motion to rotary motion and the use of the same size turning radius when changing directions. This may be accomplished by placing the pod 97 at any point in space along the X, Y, Z plane (in Cartesian coordinate) while at the same time creating roll, pitch and yaw at the wrist of the robot thereby placing the pod 97 at any orientation in space.

As noted, the Robocoaster™ system with a cage attached to the end of the robot arm is already commercially available. However the physical movement of the user inside the cage is constrained by the cage walls and ceilings in these systems. It is proposed that the cage be modified into a pod/cabin 97 in such a manner where the user is constrained by, for example, a five point harness and the cage itself to act as the overall frame and super structure.

The pod 97 may also be reconfigurable to allow the UMS to be used in a number of different applications. The interactivity between the robot 91 and the human user has been taken into account to support this aim and is demonstrated schematically in FIG. 10a. FIG. 10a shows the interactivity between the user and the robot. The module 101 is the GUI (Graphical User Interface) for the users input. The module 102 extracts the information from the input controls triggered by the user. The module 103 is responsible for the visualization presented to the user. The predefined simulation environment exists in 104. Module 105 is responsible for extracting the position and orientation information. Module 106 performs information extraction for the robot movement which is then passed to 108 the robot control module for controlling the robot. Module 107 performs information extraction for the haptics feedback which is then passed to 109 Haptics feedback control module for controlling the haptic information. Module 1010 represented the 6 DOF robot arm. The haptic actuators are presented by 1011, providing the operator with haptic information in addition to the whole body haptic sensation provided by the robot arm alone. The graphics module 1012 is for simulation environment and visualization.

The interactivity between the robot 91 and the human user may also be based on existing motion simulator technology, such as the MediaMation™ control software. One example control system package is "Universal Kinematics" from MediaMation™ to communicate with the motion controller responsible to drive the robot. A signal may be generated by the user through the user controls 1113, such as, by turning a steering wheel or pressing brake or acceleration pedals in a car driving scenario simulation. The signals possessing different parameters, such as positional coordinates, orientation transformation information and, linear and angular velocity components, may then be passed to the motion control software to trigger the built in motion commands to the controller and consequently to the robot 91 to generate appropriate motions.

Figure 10:
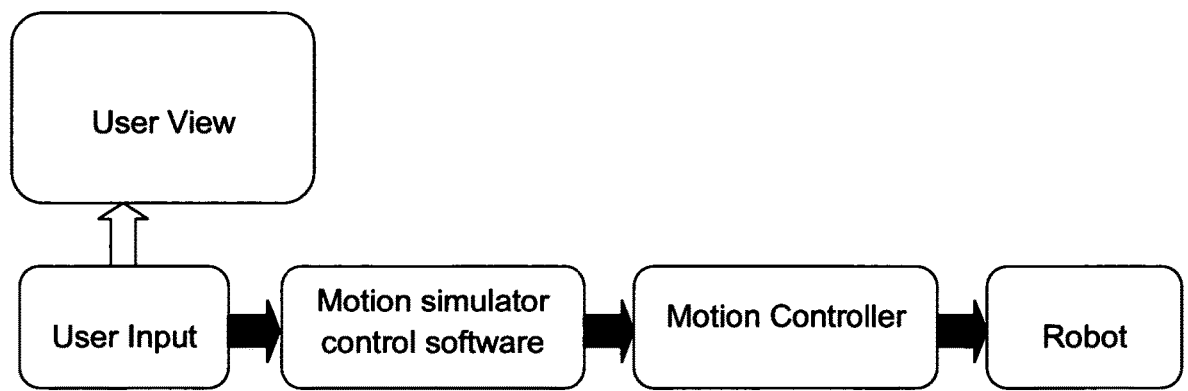
FIG. 10 is a flow chart illustrating general feedback and control for a universal motion simulator in accordance with a second preferred embodiment described herein.
Figure 10A:
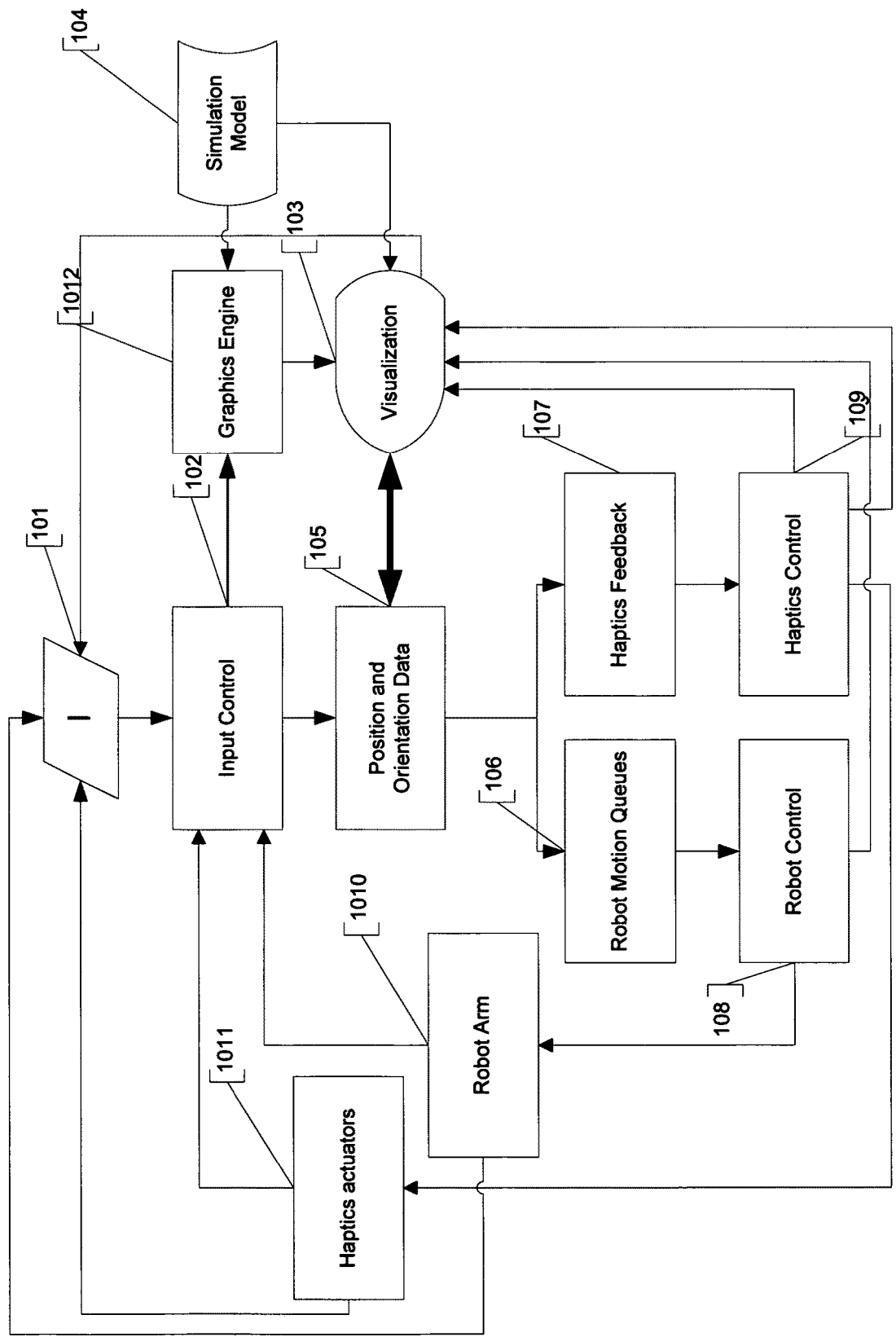
FIG. 10a is a further detailed flow chart illustrating general feedback and control for a universal motion simulator in accordance with a second preferred embodiment described herein.

In broad terms, FIG. 10 shows a flowchart diagram enabling this control from user input to the robot motion. Conceptually, FIG. 10 shows:

Driving simulator+Haptics--→MediaMation™ control software

This flow of logic involves the creation of a position of the body in space and a calculation of required velocity. Then this data is fed into the robot controller to execute the motion for that segment. In this context, 'segment' refers to a motion segment in the simulated environment that is being translated into control action to be executed by the robot controller.

A useful feature of the preferred UMS platform is to mimic the real physical motion scenarios by generating required smaller but highly detailed motions within the pod/cabin 97 using haptics systems. This is achieved through the force feedback of the haptic system such as haptic manipulator, haptic steering wheel 1113 and gearshift mechanism and reflecting the forces.

The haptics systems may generate finer detailed motions as a response to the robot arm motion in order to provide a near real experience of the real world scenario. An example of such a system can be the simulation of riding a high-speed motorbike, where at high-speed turn driver has to lean towards inside of the turn. In such simulated scenarios the robot arm 99 generates the overall motion but the feelings of balancing of the driver can only be generated by haptics system.

For simulations scenarios involving dynamic biomechanical analyses and the development of accurate human motion simulation models, an empirical motion database derived from efficient measurement and well-standardized data processing methodologies may be established. This may be obtained from motion capture units stored into a database. Some research centres may already have this data for ease of availability. The accurate measurements can be achieved by using electromagnetic and optical motion-capture systems simultaneously to record the motion data to very high accuracy and robustness. In practice, the magnetic tracker 1112 can provide the positional and orientation information of different parts of the body such as location of the arms and legs with bending angles of the joints whereas the optical tracker 1112 may provide the overall posture of the user. Both sets of information are compared and calibrated against each other to extract the true posture of the user and consequently robust human motion data. FIG. 11 shows a setup of human motion capture using electromagnetic and optical trackers 1112 simultaneously. The tracking devices 1112 using the combination of electromagnetic and optical motion sensors can provide a degree of variation in the amount of kinematic information, spatial range of measurement, external sources of noise, motion tracking time and spans a bigger information space thus the accuracy of the human motion simulation models can be highly improved. FIG. 12 shows a physical setup for human motion capture using electromagnetic and optical trackers 1112 simultaneously.

Figure 10B:
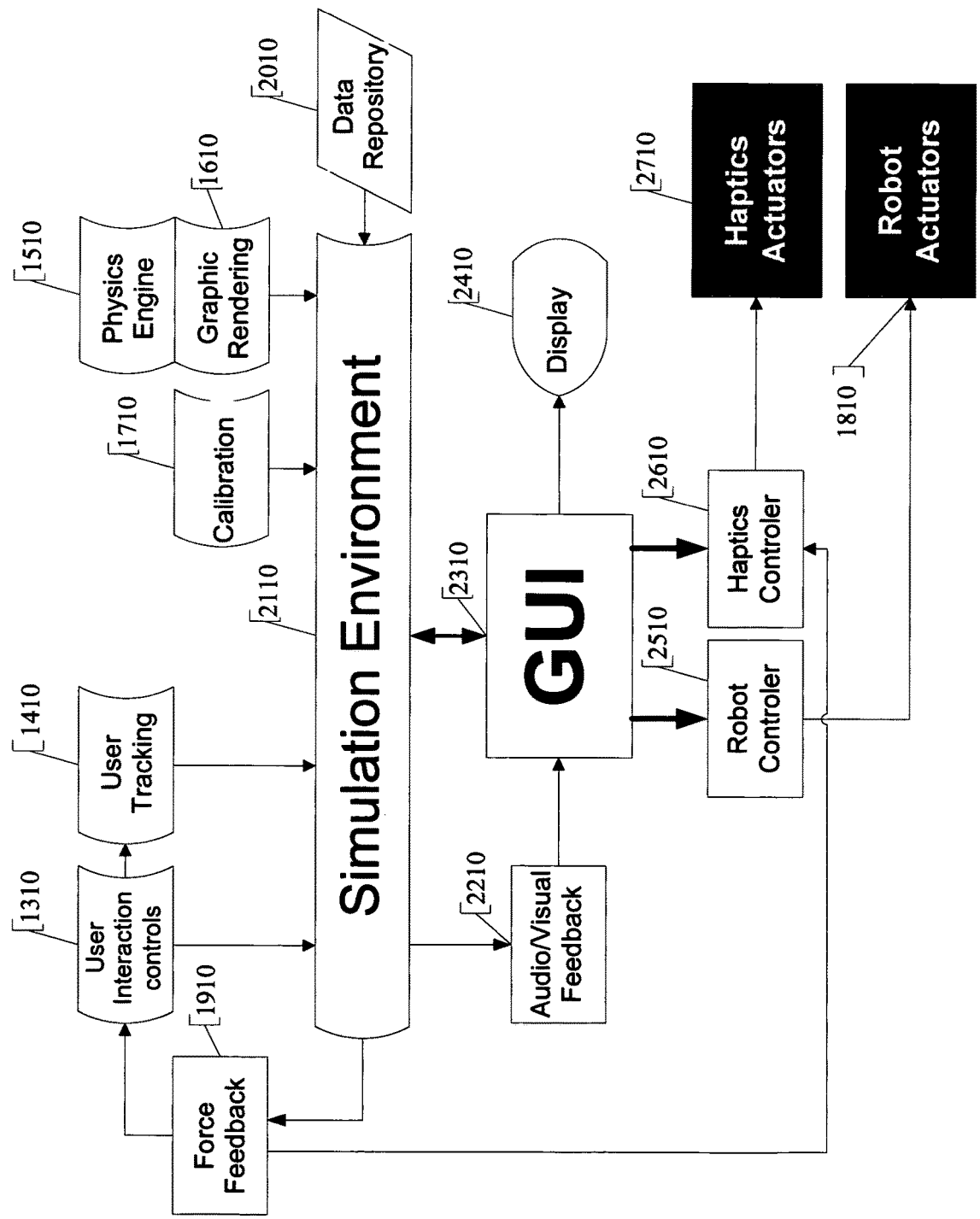
Figure 10C:
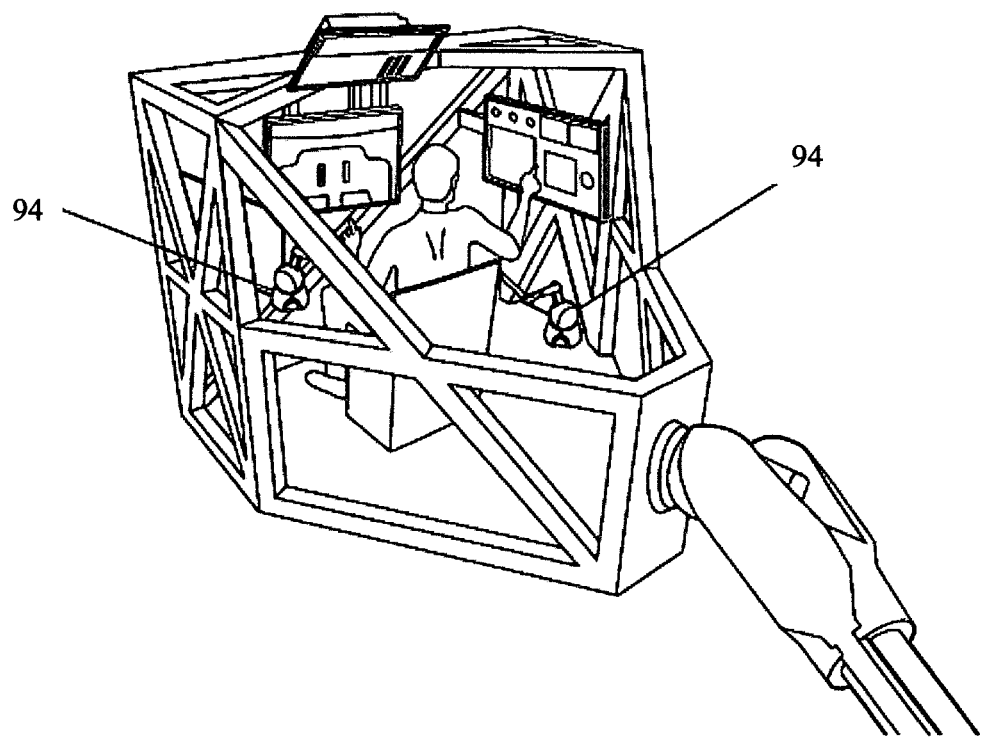
FIG. 10c is a more detailed perspective view of a modified pod as shown in FIG. 9.

With reference to FIGS. 11 and 12, once the human-user input is collected a motion controller (not shown) may be used to provide the response, monitoring and/or 3D graphical simulation of the robot. This controller may be based on a very advanced motion-control scheme. The system control architecture is presented in FIG. 10b.

1310 is the user interaction controls to interact with the simulation environment. Module 1410 tracks the user to synchronize user motion and visualization. Physics engines 1510 control the physical behavior of graphics objects, while module 1610 is responsible for the registration of graphics. The calibration module 1710 keeps the hardware and visualization synchronized during the simulation. 1810 Controls the actuation of the robot arm. The force acquisition module 1910 triggers the haptic feedback. 2010 represents the repository of data required for the simulation. The simulation environment 2110 controls the interactivity of different modules. Audio and visual feedback 2210 is generated to the user in response to different events within the simulation. The graphical user interface module 2310 provides the operator with visual information through a display 2410. The robot controller 2510 is responsible for controlling the final robot motion. The haptic controller 2610 is responsible for controlling the final robot motion. The haptic actuators 2710 provide the haptic forces to some particular part of the operator's body.

It is capable of providing extremely quick robot responses to any low or high bandwidth robot commands. In practice, the motion control may be a piece of software being executed in the robot controller (not shown) to provide the motion to the pod 97.

One attribute of the associated controller software allows the generation of robot trajectories that have programmable level of joints jerk (operator comfort) and are free of sudden change of curvature.

The system may also allow full real-time access to various high and low-level robot variables, including joints positions, joint currents, joints velocity and on-line plotting of the trajectories.

Once fully set up the system can be used as a real-time training simulator capable of responding to the user input at the time the event is occurring, and mechanically able to move in any direction at any one time. Motion capture may be used to determine human position within the pod 97 in space. The system may use this data and the input from the haptic devices 94 to determine the next course of action. The robot may be adapted to respond to input signals from the haptic device.

The proposed UMS platform facility will significantly enhance the research and development capabilities especially for automotive industry oriented research. As the automotive industry may be one of the cornerstones of the economy worldwide or individual economies, the proposed UMS may allow the industry to keep an edge over the overseas competitors and will significantly contribute to sustainability of a given economy.

It would be appreciated by the person skilled in the art that embodiments of the present invention may find application in, for example, environments that are suitable for providing telepresence although this is not to be taken as a limiting example of use. In telepresence applications, the environment that a user experiences may be real but too awkward or dangerous too actually visit. Usually some form or robot or maybe just a robotic arm may carry sensors that witness the environment and send information back to the user. These environments may relate to fields such as, for example, fire fighting, surgery and exploring mars by robot and a benefit of such telepresence systems is that they can be used to extend a user's senses beyond their normal capabilities. For example, it is envisaged that infrared or ultraviolet sensors can have their outputs remapped into the visible spectrum to allow a user to see events that may normally be invisible and, robots fitted with radiation counters can be used to explore inside the parts of nuclear power stations where it is unsafe for humans to be. For instance, the robot can check for damaged areas and report the level of radiation without endangering the operator.

A third described embodiment relates, in one form, to haptic technology and its use for the control of mobile platforms, "Mobile platform" refers to systems which have the capability to move from one place to another. Such platforms include, but are not limited to, mobile robotic systems, passenger ground vehicles and un-manned airborne vehicles.

Figure 1A:
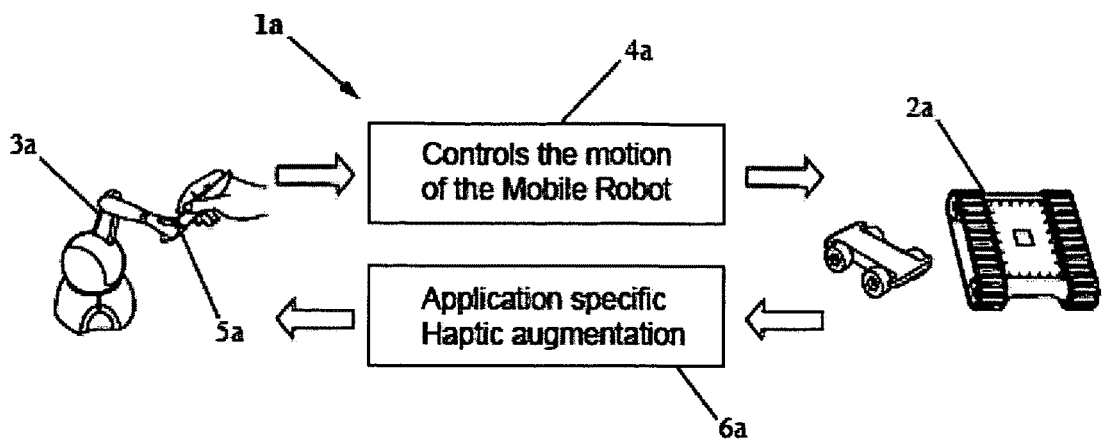
FIG. 1a is a schematic view of a known haptic interface system.
Figure 13:
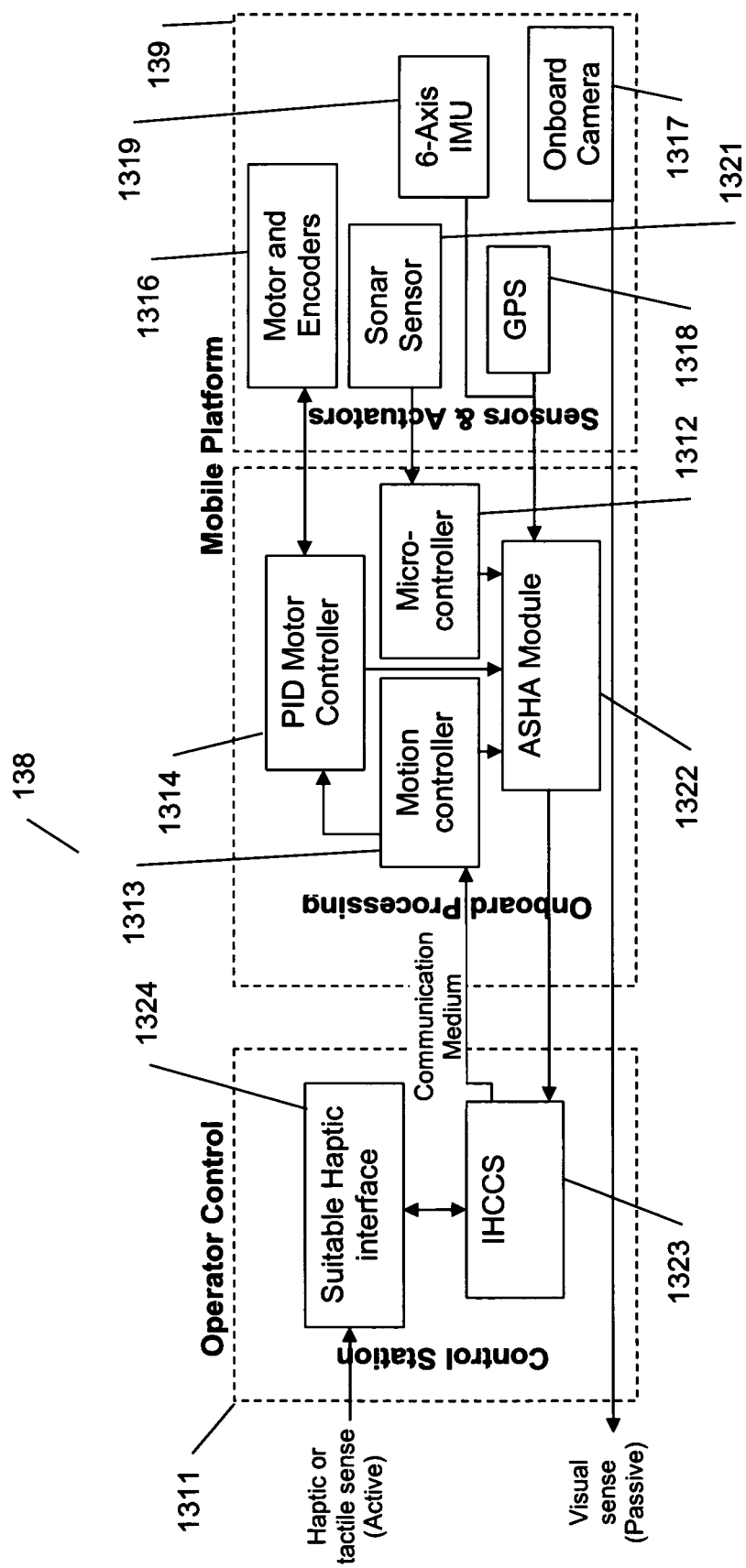
FIG. 13 is a schematic block diagram of an operator control and mobile platform according to a third preferred embodiment of the present invention.

FIG. 13 illustrates haptic systems 138 according to the third embodiment of the present invention. The module 139 illustrates components of the system 138 that would normally be mounted aboard a mobile platform such as platform 2a as shown in FIG. 1a. The module 1311 illustrates the components of the system 138 that would normally be mounted proximate the user, including within the haptic probe 3a as shown in FIG. 1a.

The module 139 comprises a micro-controller 1312 together with a motion controller 1313, a PID (proportional-integral-differential) motor controller 1314, monitors and encoders 1316, an on-board camera 1317, a GPS receiver 1318 and a 6-axis inertial measurement unit (IMU) 1319, sonar sensors 1321 and ASHA module 1322.

These components comprising module 139 may operate on the platform 2a of FIG. 1a. The program code on the micro-controller 1312 is responsible for preprocessing and control of low-level sensory systems such as the sonar sensors 1321. The PID motor controller 1314 is its own hardware module. The motion controller 1313 and ASHA module 1322 exist in executable program code on the platforms embedded computer. The ASHA module 1322 receives all the required information from the motion controller 1313, PID motor controller 1314, sonar sensors 1321 (via microcontroller 1312), GPS 1318 and the 6-axis IMU 1319. The motion controller 1313, acting under control of the ICHA 1323, generates motion control settings which are sent to the PID motor controller 1314. The PID motor controller 1314 then achieves closed loop control of the motors 1316 based on the encoder feedback 1316.

The sensory systems on the mobile platform comprise the 6-axis IMU 1319, GPS 1318 and sonar sensors 1321. The GPS 1318 and IMU 1319 directly interface to the ASHA module 1322 (software implementation on onboard computer) using serial RS-232 communication. The sonar sensors 1321 are controlled by the microcontroller 1312 which then transmits the appropriate sensory information to the ASHA module 1322 (software implementation on onboard computer) using serial RS-232 communication.

The operator control module 1311 comprises a suitable haptic interface 1324 (such as the haptic device 3a illustrated in FIG. 1a) and an input haptic control augmentation (ICHA/IHCCS) 1323. The haptic interface 1324 receives physical inputs (such as movement of the probe 5a of FIG. 1a) from the operator and delivers haptic augmentation back to the operator. The construction and operation of the ICHA 1323, and its interactions with the haptic interface 1324, are described in more detail below.

Figure 14:
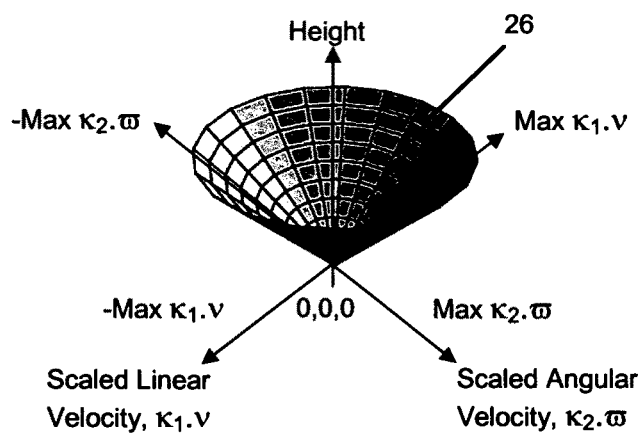
FIGS. 14, 15 and 16 illustrate details of the embodiment illustrated in FIG. 13.

FIG. 14 illustrates a haptically-rendered control surface 26 that is presented to the user in accordance with the third preferred embodiment of the present invention.

According to the presently-described embodiment of the invention, the haptically-rendered virtual surface 26 is achieved using off-the-shelf hardware and appropriate control software. The haptically-rendered virtual surface 26, can be "felt" or "touched" by the user depending on the particular implemented haptic device. Suitable devices include but are not limited to, the Phantom™ Omni™ Desktop and Premium devices; and the Falcon™ from Novint™ Technologies.

The preferred shape of the haptic control surface 26 is designed to serve as an indicator to the operator of the values of commanded input linear velocity "v" and angular velocity "w" of a remote platform. That is, the shape of the haptic control surface 26 is defined by the following equation:

$$[(k_1 \cdot v)^2 + (k_2 \cdot \omega)^2]^{1/2} = k_3 \cdot z \quad (1)$$

where $k_1$ and $k_2$ scale the appropriate ranges of v and ω relative to each other $k_3$ is a constant related to the slope of that particular cone; and Given appropriate values of $k_1$, $k_2$ and $k_3$, the z value (height) for any point (v, ω) is given by $$z=[(k_1 \cdot v)^2+(k_2 \cdot \omega)^2]^{1/2}/k_3 \qquad (2)$$

Subject to the maximum desired linear (v) and angular (ω) velocities $$[(k_1 \cdot \text{Max}v)^2+(k_2 \cdot \text{Max}\omega)^2]^{1/2}=k_3 \cdot \text{Max}z \qquad (3)$$

where

Max v and Max ω represent the desired maximum platform velocities

Considering the use of the Phantom™ Omni™ by Sensable Technologies (http://www.sensable.com/) and the Pioneer™ P3DX Mobile Robot (http://www.activrobots.com/ROBOTS/p2dx.html) as a specific combination of hardware devices.

The Phantom™ Omni™ offers a usable haptic workspace of 160 W×120 H×70 D. The Pioneer™ P3DX offers a maximum published linear velocity (v) of 1.6 metres-per-second. The suitable angular velocity (w) needs to be determined empirically, however for the purposes of explanation we consider a feasible maximum angular velocity to be 0.5 full rotations (180 degrees) per second. It also needs to be considered that in reality the maximum individual linear and angular velocities may not be achievable when including significant contributions of each another.

As such, we consider the maximum linear velocity of 1 metre per second and angular velocity of 0.25 full rotations a second. The scaling factors of $k_1$, $k_2$ serve two purposes, to scale $k_1$ and $k_2$ relative to each other and to scale the dimensions to that of the workspace of the implemented haptic device. The device offers a workspace of 160 W×120 H×70 D, representing the ω, v, height dimensions respectively (see FIG. 14), and as, such the depth of 70 mm is the limiting factor. Choosing a nominal 65 mm range along both the ω and v axes, k1 and k2 are chosen appropriately where:

for ω, 0.25*k2=66/2
and v, 1*k1=65/2
which satisfies $$[(k1 \cdot \text{Max}v)2+(k2 \cdot \text{Max}\omega)2]^{1/2}=k3 \cdot \text{Max}z$$

where k3 is chosen appropriately.

Implementation of ICHA Independent of ASHA

When the ICHA is to be considered independently, there are alternative preferred methodologies to render the required virtual haptic surface. One suitable method to render the virtual haptic conical surface provides force rendering in the Z-direction only. Given an actual Z position, given by $Z_{actual}$ and a desired Z position given by equation 2, the difference (between Z position, given by $Z_{actual}$) can be used by a variety of control techniques to render the desired surface. There are various proven techniques for rendering haptic surfaces and the display of haptic forces to a user. Such methods include the use of mass-spring-damper, mass-string and spring models, and proportional-integral-control (PID). The actual method employed depends on various factors such as the characteristics of the employed haptic device, whether the device software libraries provide such pre-built software functions, etc, as well as the desired stiffness or hardness of the rendered conical surface. In general, the position of the haptic probe (x, y, z) needs to be monitored and the appropriate forces applied, given the implemented control strategy. There are various proven control methods for rendering such surfaces.

Figure 17:
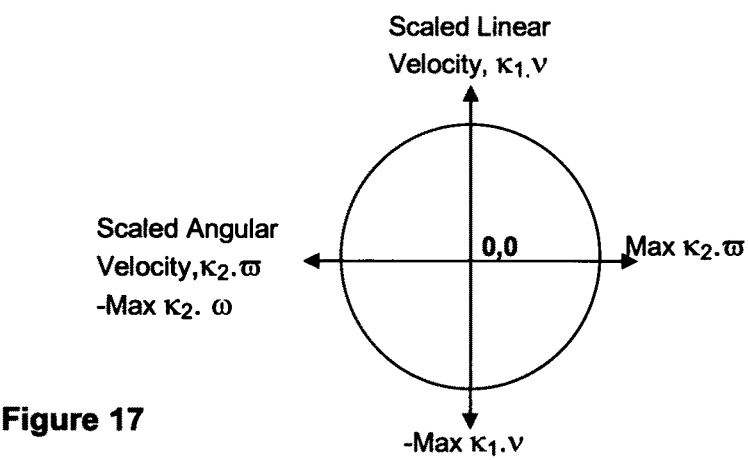

FIG. 17 demonstrates the difference between the existing 2-D planar haptic control surface (http://citeseer.ist.psu.edu/705176.html) and the 3-D ICHA described above. In FIG. 17, v and ω denote the linear and angular velocities respectively of a platform 2a as shown in FIG. 1a. As is shown in FIG. 17, the orthogonal displacements of a haptic probe 3a of FIG. 1a from the origin in two dimensions signify the values of commanded input linear and angular velocities to the remote platform. In contrast, as described above with reference to equations (1), (2) and (3) and FIG. 14, according to the third embodiment of the present invention the user is constrained to move the input probe 3a in conformity with a three-dimensional surface in which the displacement of the probe in the third dimension (the height Z in FIG. 14) is also indicative of the values of linear and angular velocity.

Figure 17A:
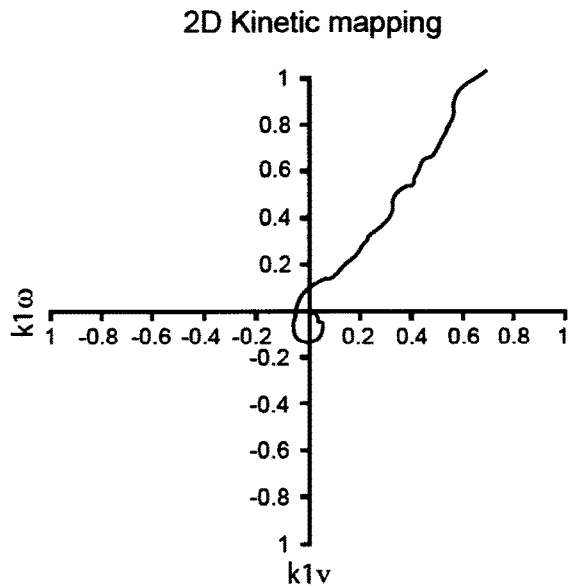
Figure 15:
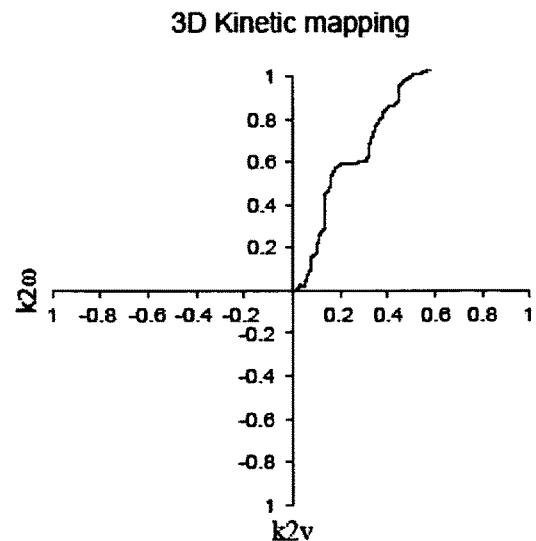

FIGS. 17a and 15 illustrate differences in performance between the prior art arrangement of FIG. 17 and the third embodiment of the present invention according to FIG. 14.

In particular, FIG. 15 demonstrates the operator's ability to return the command input to a zero motion state using an ICHA according to FIG. 14. In providing motion commands the operator can exploit the geometry of the cone in returning to a 0,0,0 position. When an operator has experience in operating with a surface of a given gradient, then the operator will be able to judge the commanded velocity, based on the vertical displacement of the haptic probe. It will be seen from FIGS. 17a and 15 that, using ICHA according to the third embodiment of the present invention, the actual angular and linear velocities of the remote platform 2a both simultaneously return directly to zero whereas in the system according to FIG. 17, there is overshoot of linear and angular velocities both overshoot zero before coming back to zero.

The preferred conical form of the ICHA provides unique attributes to a user who is controlling the motion of a mobile platform. The geometric properties of a cone result in convergence to a particular point on the haptically rendered control surface. The user is easily able to determine a zero velocity command state by following the conical surface to its point of convergence. Additionally the gradient of cone surface provides the user, particularly an experienced user, with an indication of the current commanded velocity. When an operator has experience in operating with a surface of a given gradient, then the operator will be able to judge the commanded velocity, based on the vertical displacement of the haptic probe.

Implementation of ICHA Integrated with ASHA

According to alternative aspects of the third preferred embodiment of the invention, ICHA and ASHA are integrated and presented to the operator by way of a single haptically-rendered control surface 26.

When the motion of the remote platform 2a is such that there is no ASHA being generated, movement of the haptic probe over the virtual surface 26 is unopposed, subject only to the constraint imposed on movement by the maximum limits of angular and linear velocity. When the motion of the remote platform 2a is such that it is necessary to provide ASHA to the operator, it is the case that the user can easily recognize the forces implementing the ASHA and readily distinguish the ASHA from the ICHA.

Figure 16:
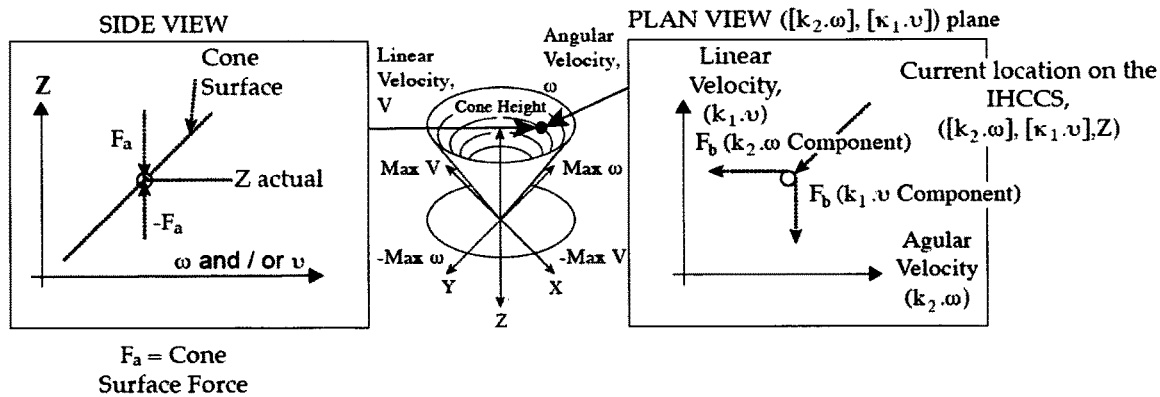

Given that a haptic device needs to be adequately programmed to haptically render any virtual surfaces and/or forces in order to implement this approach, there are two components requiring consideration. These are the haptic rendering of the ICHA and the simultaneous haptic rendering of the ASHA. As such, in implementation of this approach, any instantaneous rendered haptic force will be an appropriate simultaneous combination of the force required to render the ICHA as well any required ASHA. There are several different possible approaches which may be taken to render the required virtual haptic surface. One preferred method for determining the actual force required to render the haptic augmentation acting across the ICHA is the vectorial combination of haptically rendered forces. This is explained in further in FIG. 16, where $F_b$ denotes the haptic augmentation force components and $F_a$ denotes the ICHA force components.

Figure 18:
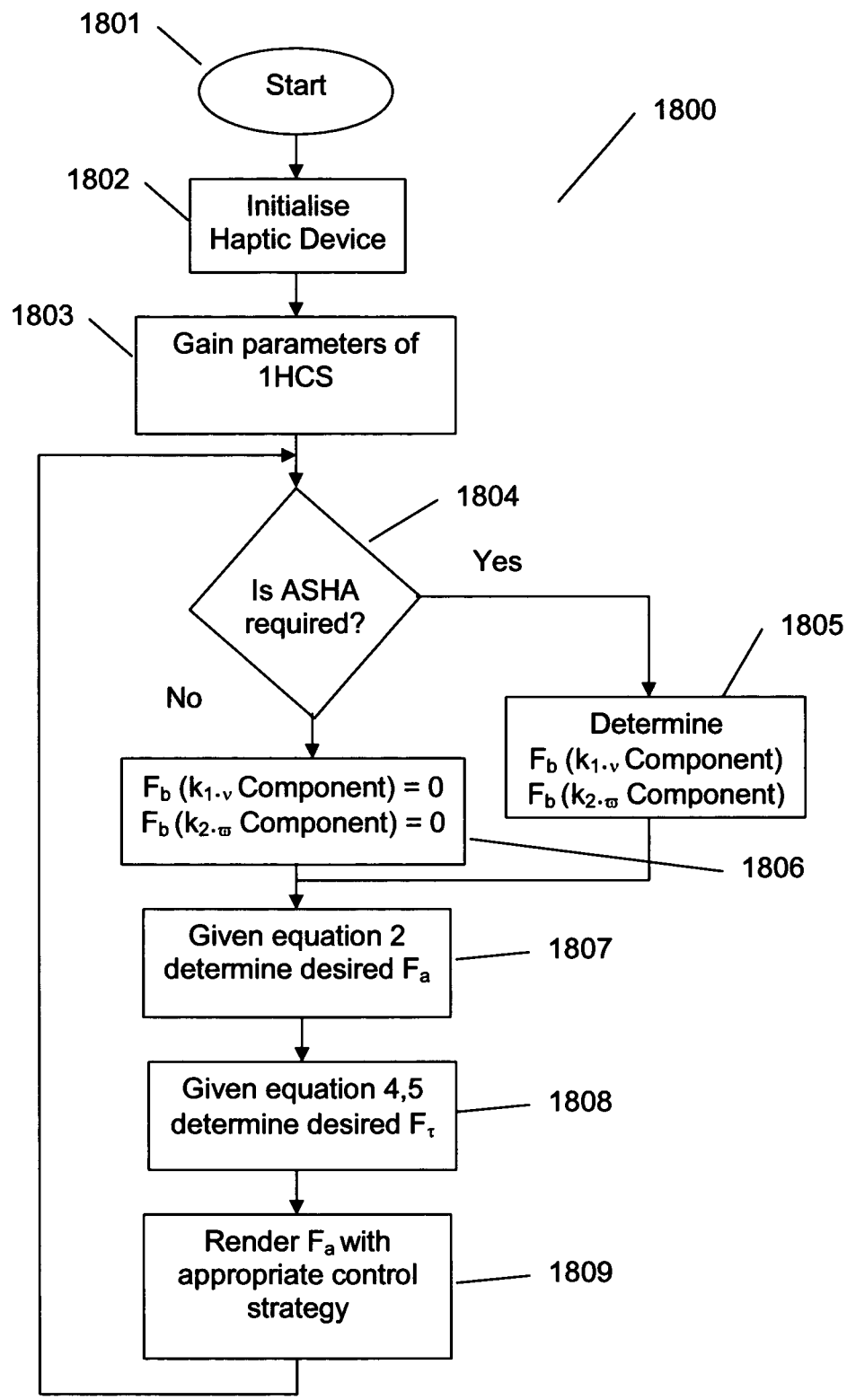
FIG. 18 is a flow-chart illustrating aspects of the operation of the embodiment of FIG. 13.

FIG. 18 shows a flow-chart which illustrates the processing 1800 to provide both ICHA and AHSA.

At step 1802, the haptic device is initialized.

At step 1803, the parameters of the ICHA are ascertained. These parameters comprise the maximum linear velocity Max v, the maximum angular velocity Max ω and the scaling factors $k_1$, $k_2$, $k_3$.

At step 1804 a decision is made whether ASHA is required. If ASHA is required, then the magnitude of the force components in the w and v directions are received from ASHA (Step 1805), if ASHA is not required, then the force components of the ASHA are zero (Step 1806).

At step 1807 we determine the force required render the ICHA alone.

At step 1808 we determine the resultant force combining ICHA and ASHA

At step 1809 the resultant haptic forces are rendered.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, a person skilled in the art will recognise that embodiments of the invention described herein may be implemented using one or more computers. In that case, the method steps disclosed herein may be embodied as instructions that comprise a computer program. The program may be stored on computer-readable media, such as floppy disks, optical discs (eg compact discs), or fixed disks (such as hard drives and the like), and may be resident in memory, such as, for example random access memory (RAM), read-only memory (ROM), firmware, or flash RAM memory. The program as software may then be executed on a computer or microprocessor device to implement the method. The program or portions of its execution, may also be distributed over multiple computers or servers in a network having a topology corresponding to one or a combination of: a small area such as in a LAN (Local Area Network); a large campus or city area such as in a MAN (Metropolitan Area Network) or; a wide geographical area such as in a WAN (Wide Area Network). As an example, the first embodiment described herein may be suitable for use with a computer network implementation of a quality assurance (QA) or maintenance system for diagnosing faults and servicing modules or instruments to effect service and repairs and upgrades to instrument software from a remote platform or a central controller or micro-controller.

It should be noted that where the terms "server", "secure server" or similar terms are used herein, a communication device is described that may be used in a communication system, unless the context otherwise requires, and should not be construed to limit the present invention to any particular communication device type. Thus, a communication device may comprise, without limitation, a bridge, router, bridge-router (router), switch, node, or other communication device, which may or may not be secure.

It should also be noted that where a flowchart, set of rules or their equivalent is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the invention may be embodied in many different forms, comprising computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means comprising any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, comprising a source code form, a computer executable form, and various intermediate forms (e.g., forms generated by an assembler, compiler, linker, or locator). Source code may comprise a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g, a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (comprising programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

As the present invention may be embodied in several forms without departing from the spirit of the essential characteristics of the invention, it should be understood that the above described embodiments are not to limit the present invention unless otherwise specified, but rather should be construed broadly within the spirit and scope of the present invention as defined in the appended claims. Various modifications and equivalent arrangements are intended to be included within the spirit and scope of the present invention and appended claims. Therefore, the specific embodiments are to be understood to be illustrative of the many ways in which the principles of the present invention may be practiced. For example, although a haptic device has been described herein in certain embodiments as capable of interacting (or reading and writing) to and from the human hand, it may also be appreciated that such a device may be designed to read and write to and from the human foot or some other part of the body whilst still embodying embodiments of the present invention. Furthermore, those familiar with the haptic arts will recognize that there are many different haptic interfaces that convert the motion of an object under the control of a user to electrical signals, many different haptic interfaces that convert force signals generated in a computer to mechanical forces that can be experienced by a user, and haptic interfaces that accomplish both results, each and every one of which may be encompassed by the present invention.

In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof."

The claims defining the invention are as follows:

1. A method of simulating motion, the method comprising the steps of:
   providing at least six degrees of freedom of movement to a user by operatively associating an anthropomorphic robot arm with a user pod for receiving the full body of the user, wherein the robot arm is adapted to position the user pod in a Cartesian coordinate system anywhere in the X, Y, and Z plane at any orientation; and
   providing haptic feedback to the user in correspondence with the movement of the user pod and the user, said haptic feedback comprising, in addition to a whole body haptic sensation provided by the robot arm alone, at least one minor motion cue generated by at least one haptic actuator provided in the pod and operatively associated with the user to provide detailed but low intensity motion sensations for the user such that at least one force feedback cue is generated by the at least one haptic actuator for simulating physical phenomena encountered by the user in a simulated environment by providing haptic forces to parts of the user's body.

2. A method as claimed in claim 1 further comprising one or a combination of the following steps of:
   providing the user with a perception of a simulated environment; and
   tracking the motion of the user.

3. A method as claimed in claim 2 wherein the step of providing haptic feedback further comprises:
   feeding back the tracked motion of the user to an interface for adapting the user's perception of the simulated environment.

4. A method as claimed in claim 3 wherein the step of feeding back comprises transforming the user's view by a negative amount that compliments the tracked motion.

5. A method as claimed in claim 2 wherein the tracked motion comprises one or a combination of:
   position in Cartesian coordinates X, Y and Z; and,
   orientation comprising yaw, pitch and roll.

6. A method as claimed in claim 2 wherein the step of tracking the motion of the user comprises one or a combination of positional and/or orientational information of the user's body and/or body parts and is obtained by one or a combination of:
   magnetic;
   electromagnetic; and
   optical motion trackers.

7. A method as claimed in claim 1 further comprising the step of:
   providing at least one major motion cue generated by the robot arm and corresponding to a position and/or orientation of the pod.

8. A method as claimed in claim 1 further comprising the step of:
   operatively associating a software control to relate a plurality of simulated environment applications with a motion controller of the robot arm.

9. A method as claimed in claim 8 wherein the step of operatively associating the software control with the motion controller comprises the steps of:
   generating user control signals associated with pod devices controlled by the user and comprising motion parameters;
   communicating the control signals to the software control for triggering motion commands for the robot arm.

10. A method as claimed in claim 1 further comprising the step of one or a combination of:
   generating an empirical motion database comprising captured motion data for simulating predetermined simulation scenarios and/or modelling;
   accessing an existing empirical motion database comprising captured motion data for simulating predetermined simulation scenarios and/or modelling.

11. Apparatus adapted to simulate motion, said apparatus comprising:
- a microprocessor, microcontroller, digital signal processor, or general purpose computer adapted to operate in accordance with a predetermined instruction set,
- said apparatus, in conjunction with said instruction set, being adapted to perform the method as claimed in claim 1.

12. A computer program product comprising:
- a non-transitory computer usable medium having computer readable program code and computer readable system code embodied on said medium for simulating motion within a data processing system, said computer program product comprising:
- computer readable code within said computer usable medium for performing the steps of claim 1.

13. Motion simulator apparatus comprising, in combination:
- an anthropomorphic robot arm adapted to provide six degrees of freedom of movement;
- a user pod for receiving the full body of a user, said user pod being operatively connected to the anthropomorphic robot arm to position the user pod in a Cartesian coordinate system anywhere in the X, Y, and Z plane at any orientation; and
- a haptic interface operatively associated with the user pod for providing haptic feedback to the user in correspondence with the movement of the user pod and the user, said haptic feedback comprising, in addition to a whole body haptic sensation provided by the robot arm alone, at least one minor motion cue generated by at least one haptic actuator provided in the pod and operatively associated with the user to provide detailed but low intensity motion sensations for the user such that at least one force feedback cue is generated by the at least one haptic actuator for simulating physical phenomena encountered by the user in a simulated environment by providing haptic forces to parts of the user's body.

14. Apparatus as claimed in claim 13 further comprising:
- a user control interface operatively associated with the pod and the robot arm for providing a user with a perception of a simulated environment; and
- tracking devices for tracking the motion of the user.

15. Apparatus as claimed in claim 14 wherein the haptic interface is adapted for feeding back the tracked motion of the user to the user control interface for adapting the user's perception of the simulated environment.

16. Apparatus as claimed in claim 15 wherein one or a combination of the haptic interface, the user control interface and the tracking devices is adapted for transforming the user's view by a negative amount that compliments the tracked motion.

17. Apparatus as claimed in claim 14 wherein the tracked motion comprises one or a combination of:
- position in Cartesian coordinates X, Y and Z; and
- orientation comprising yaw, pitch and roll.

18. Apparatus as claimed in claim 14 wherein tracked motion comprises one or a combination of positional and/or orientational information of the user's body and/or body parts and the tracking device for tracking the motion of the user comprise one or a combination of:
- magnetic;
- electromagnetic; and
- optical motion trackers.

19. Apparatus as claimed in claim 13 wherein the apparatus is adapted to provide:
- at least one major motion cue generated by the robot arm and corresponding to a position and/or orientation of the pod.

20. Apparatus as claimed in claim 13 further comprising:
- a computer product comprising a software control to relate a plurality of simulated environment applications and adapted for operative association with a motion controller of the robot arm.

21. Apparatus as claimed in claim 20 wherein the software control is operatively associated with the motion controller by:
- user controls for generating user control signals associated with pod devices controlled by the user and comprising motion parameters;
- where said user control signals are communicated to the software control for triggering motion commands for the robot arm.

22. Apparatus as claimed in claim 13 further comprising one or a combination of:
- an empirical motion database generated in situ and comprising captured motion data for simulating predetermined simulation scenarios and/or modelling; and
- accessing means for accessing an existing empirical motion database comprising captured motion data for simulating predetermined simulation scenarios and/or modelling.

* * * * *